United States Patent
Cuthbert et al.

(10) Patent No.: US 10,726,212 B2
(45) Date of Patent: Jul. 28, 2020

(54) PRESENTING TRANSLATIONS OF TEXT DEPICTED IN IMAGES

(71) Applicant: Google LLC, Mountain View, CA (US)

(72) Inventors: Alexander Jay Cuthbert, Oakland, CA (US); Joshua J. Estelle, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/263,898

(22) Filed: Jan. 31, 2019

(65) Prior Publication Data
US 2019/0163748 A1    May 30, 2019

Related U.S. Application Data

(63) Continuation of application No. 15/216,399, filed on Jul. 21, 2016, now Pat. No. 10,198,439, which is a (Continued)

(51) Int. Cl.
*G06K 9/32* (2006.01)
*G06F 40/58* (2020.01)
(Continued)

(52) U.S. Cl.
CPC .............. *G06F 40/58* (2020.01); *G06F 3/018* (2013.01); *G06F 40/47* (2020.01);
(Continued)

(58) Field of Classification Search
CPC .............................. G06K 9/3258; G06F 17/28
See application file for complete search history.

(56) References Cited

U.S. PATENT DOCUMENTS

| 5,063,508 A | 11/1991 | Yamada et al. |
| 5,991,755 A | 11/1999 | Noguchi et al. |

(Continued)

FOREIGN PATENT DOCUMENTS

| EP | 0810534 | 12/1997 |
| EP | 2587389 | 5/2013 |

(Continued)

OTHER PUBLICATIONS

Anonymous, "CamDictionary: Never lost in translation," European Journalism Centre (EJC), Jul. 1, 2013, Retrieved from the Internet: URL:http://ejc.net/resources/article/camdictionary-never-lost-in-translation [retrieved on May 18, 2015], 2 pages.
(Continued)

*Primary Examiner* — Feng-Tzer Tzeng
(74) *Attorney, Agent, or Firm* — Fish & Richardson P.C.

(57) ABSTRACT

Methods, systems, and apparatus, including computer programs encoded on a computer storage medium, for presenting additional information for text depicted by an image. In one aspect, a method includes receiving an image. Text depicted in the image is identified. The identified text can be in one or more text blocks. A prominence presentation context is selected for the image based on the relative prominence of the one or more text blocks. Each prominence presentation context corresponds to a relative prominence of each text block in which text is presented within images. Each prominence presentation context has a corresponding user interface for presenting additional information related to the identified text depicted in the image. A user interface is identified that corresponds to the selected prominence presentation context. Additional information is presented for at least a portion of the text depicted in the image using the identified user interface.

20 Claims, 16 Drawing Sheets

Related U.S. Application Data continuation of application No. 14/076,029, filed on Nov. 8, 2013, now Pat. No. 9,547,644.

(51) Int. Cl.
  G06K 9/00 (2006.01)
  G06F 40/47 (2020.01)
  G06F 3/01 (2006.01)

(52) U.S. Cl.
  CPC ......... G06K 9/00671 (2013.01); G06K 9/325 (2013.01); G06K 9/3258 (2013.01)

(56) References Cited

U.S. PATENT DOCUMENTS

| | | | |
|---|---|---|---|
| 6,147,670 | A | 11/2000 | Rossmann |
| 6,185,329 | B1 | 2/2001 | Zhang et al. |
| 6,539,116 | B2 | 3/2003 | Takaoka |
| 6,710,774 | B1 * | 3/2004 | Kawasaki ......... G01C 21/3638 345/419 |
| 6,823,084 | B2 | 11/2004 | Myers |
| 7,873,901 | B2 | 1/2011 | Chen |
| 7,962,462 | B1 | 6/2011 | Lamping et al. |
| 8,095,355 | B2 | 1/2012 | Rosart et al. |
| 2002/0064316 | A1 | 5/2002 | Takaoka |
| 2003/0120478 | A1 | 6/2003 | Palmquist |
| 2004/0210444 | A1 | 10/2004 | Arenburg et al. |
| 2005/0123200 | A1 | 6/2005 | Myers |
| 2006/0036955 | A1 | 2/2006 | Baudisch |
| 2006/0152479 | A1 | 7/2006 | Carlson et al. |
| 2007/0121005 | A1 | 5/2007 | Gutta et al. |
| 2007/0192020 | A1 * | 8/2007 | Brulle-Drews .... G01C 21/3647 701/532 |
| 2008/0002893 | A1 * | 1/2008 | Vincent ................ G06K 9/3258 382/229 |
| 2008/0233980 | A1 | 9/2008 | Englund et al. |
| 2008/0300859 | A1 | 12/2008 | Chen et al. |
| 2009/0313536 | A1 | 12/2009 | Karidi et al. |
| 2010/0040287 | A1 | 2/2010 | Jain et al. |
| 2011/0026081 | A1 | 2/2011 | Hamada et al. |
| 2011/0166918 | A1 | 7/2011 | Allaire et al. |
| 2011/0313754 | A1 | 12/2011 | Bastide et al. |
| 2012/0163668 | A1 | 6/2012 | Englund et al. |
| 2013/0004068 | A1 | 1/2013 | Koo et al. |
| 2013/0055098 | A1 | 2/2013 | Bennett |
| 2013/0067307 | A1 | 3/2013 | Tian et al. |
| 2014/0187223 | A1 * | 7/2014 | Ivanchenko ......... G06K 9/3283 455/418 |
| 2015/0199727 | A1 | 7/2015 | Naveh |

FOREIGN PATENT DOCUMENTS

| | | |
|---|---|---|
| JP | H02-249064 | 10/1990 |
| JP | H09-305623 | 11/1997 |
| JP | H11-120185 | 4/1999 |
| JP | 2000-132639 | 5/2000 |
| JP | 2011-65573 | 3/2011 |
| JP | 2012-008979 | 1/2012 |
| JP | 2012-079076 | 4/2012 |
| JP | 2012-48302 | 3/2018 |
| WO | WO 2001/004790 | 1/2001 |
| WO | WO 2012/158047 | 11/2012 |
| WO | WO-2015028841 A1 * | 3/2015 ............. G06F 40/40 |

OTHER PUBLICATIONS

Anonymous, "Reviews of 5 OCR apps that recognize Chinese," The World of Chinese, Apr. 11, 2013, Retrieved from the Internet: URL:http://www.theworldofchinese.com/2013/04/ocr-app-faceoff-can-your-phone-read-chinese/ [retrieved on May 18, 2015], 7 pages.

Chinese Office Action issued in Chinese Application No. 201480061355.x, dated Mar. 14, 2018, 18 pages (with English Translation).

Duygulu-Sahin, "Translating Images to Words: a Novel Approach for Object Recognition," Middle East Technical Univ., Feb. 2003, 143 pages.

European Office Action issued in European Application No. 14800220.7, dated Jun. 25, 2018, 6 pages.

Extended European Search Report in European Application No. 16197409.2-1507 dated Jan. 24, 2017, 8 pages (no new art).

International Preliminary Report on Patentability in International Application No. PCT/US2014/064086, dated May 19, 2016, 7 pages.

International Search Report and Written Opinion in International Application No. PCT/US2014/064086, dated May 26, 2015, 11 pages.

Japanese Office Action issued in Application No. 2016-525041, dated Jul. 24, 2017, 10 pages (with English Translation).

Japanese Office Action issued in Application No. 2016-525041, dated Dec. 25, 2017, 9 pages (with English Translation).

JP Office Action issued in Japanese Application No. 2016-181347, dated Aug. 13, 2018, 7 pages (with English translation).

Kazmucha, "Word Lens for iPhone review," iMore, Apr. 5, 2013, (Retrieved from the Internet: URL: http://www.iniore.com/word-lens-iphonereview [retrieved on May 18, 2015], 5 pages.

Summons to attend Oral Proceedings in European Patent Application No. 16197409.2, dated Jul. 5, 2019, 7 pages.

Anonymous, "Readability—Wikipedia", Nov. 2013, retrieved from the internet: URL https://en.wikipedia.org/w/index.php?litle""Readability&direction""nexl&oldid=576723467, 17 pages.

EP Notice of Oral Proceedings in European Application No. 16197409, dated Nov. 4, 2019, 8 pages.

Summons to Attend Oral Proceedings in Application No. 14800220.7, dated Mar. 13, 2020, 6 pages.

* cited by examiner

PRESENTING TRANSLATIONS OF TEXT DEPICTED IN IMAGES

CROSS-REFERENCE TO RELATED APPLICATIONS

This application is a continuation application of, and claims priority to, U.S. patent application Ser. No. 15/216,399, titled "PRESENTING TRANSLATIONS OF TEXT DEPICTED IN IMAGES," filed on Jul. 21, 2016, which is a continuation application of, and claims priority to, U.S. patent application Ser. No. 14/076,029, now U.S. Pat. No. 9,547,644, titled "PRESENTING TRANSLATIONS OF TEXT DEPICTED IN IMAGES," filed on Nov. 8, 2013. The disclosures of the foregoing applications are incorporated herein by reference in their entirety for all purposes.

BACKGROUND

Many user devices, such as smartphones, come equipped with a camera for capturing pictures and digital images. Users often use the cameras to capture pictures while traveling and share the pictures via multimedia messaging or social networking sites. Users can also use the images to obtain additional information related to an object or location. For example, a user may capture an image of a landmark and initiate an Internet search using the image as a query.

When traveling in another country that speaks a different language than the user, the user may want to obtain a translation of text that the user encounters. For example, a user may encounter a street sign that is in a foreign language while traveling within another country, or a list of items in the foreign language.

SUMMARY

This specification describes technologies relating to presenting additional information related to text depicted in an image (e.g., a language translation of the text) based on a presentation context associated with the image.

In general, one innovative aspect of the subject matter described in this specification can be embodied in methods that include the actions of receiving an image; identifying text depicted in the image; selecting, for the image, a presentation context from presentation contexts based on an arrangement of the text depicted by the image, wherein each presentation context corresponds to a particular arrangement of text within images and each presentation context has a corresponding user interface for presenting additional information related to the text depicted in the image, wherein the user interface for each presentation context is different from the user interface for other presentation contexts; identifying the user interface that corresponds to the selected presentation context; and presenting additional information for at least a portion of the text depicted in the image using the identified user interface, the user interface presenting the additional information in an overlay over the image. Other embodiments of this aspect include corresponding systems, apparatus, and computer programs, configured to perform the actions of the methods, encoded on computer storage devices.

These and other embodiments can each optionally include one or more of the following features. The additional information can include a language translation of the at least a portion of the identified text. Selecting the presentation context for the image can include identifying a number of individual text blocks depicted in the image and selecting the presentation context for the image based on the number of individual text blocks depicted in the image.

Selecting the presentation context for the image can include determining, based on the arrangement of the text depicted in the image, that a first portion of the text is presented more prominently than at least one other portion of the text; and selecting a prominence context from the presentation contexts in response to the determination.

Identifying the user interface that corresponds to the selected presentation context can include identifying a prominence user interface that corresponds to the prominence context. Presenting additional information for at least a portion of the text depicted in the image can include presenting a language translation of the first portion of the text in an overlay over the first portion of the text.

Selecting the presentation context for the image can include determining that the text depicted in the image includes an address and selecting a map context from the presentation contexts in response to the determination. Identifying the user interface that corresponds to the selected presentation context can include identifying a map user interface that corresponds to the map context. Presenting additional information for at least a portion of the text depicted in the image can include presenting a language translation of the address within an image of a map.

Identifying the user interface that corresponds to the selected presentation context can include identifying a map user interface that corresponds to the map context. Presenting additional information for at least a portion of the text depicted in the image can include presenting a title corresponding to the address within an image of the map. The title can be presented in a language of a user associated with a device presenting the image of the map.

Selecting the presentation context for the image can include identifying individual text blocks depicted in the image; determining that the individual text blocks belong to a collection of text based on an arrangement of the individual text blocks and presentation of the individual text blocks; and selecting a collection context from the presentation contexts in response to the determination.

Identifying the user interface that corresponds to the selected presentation context can include identifying a collection user interface that corresponds to the collection context. Presenting additional information for at least a portion of the text depicted in the image can include presenting a language translation of text depicted in each individual text block in an overlay over the image. Each language translation can be presented above the language translation's corresponding text block.

In general, another aspect of the subject matter described in this specification can be embodied in methods that include the actions of receiving an image; identifying text depicted in the image, the identified text being in one or more text blocks identified in the image, each text block being distinct from other text blocks in the image; selecting, for the image, a prominence presentation context from prominence contexts, wherein each prominence presentation context corresponds to a relative prominence of each text block in which text is presented within images and each prominence presentation context has a corresponding user interface for presenting additional information related to the identified text depicted in the image, the selecting of the prominence presentation context being based on the relative prominence of the one or more text blocks in which the identified text is depicted in the image; identifying a user interface that corresponds to the selected prominence presentation context; and presenting additional information for at least a portion of the text depicted in the image using the identified user interface, the user interface presenting the additional information in an overlay over the image. Other embodiments of this aspect include corresponding systems, apparatus, and computer programs, configured to perform the actions of the methods, encoded on computer storage devices.

These and other embodiments can each optionally include one or more of the following features. Selecting the prominence presentation context for the image can include determining that the text depicted in the image includes a single text block of prominently displayed text based on a location of the single text block within the image and a size of text included in the single text block; and selecting a single block context from the prominence presentation contexts in response to the determination. The single block context can correspond to a user interface that presents a language translation of the text included in the single text block of prominently displayed text in an overlay over the single text block of prominently displayed text.

Identifying text depicted in the image can include identifying a first text block and a second text block that is different from the first text block, the first and second text blocks being depicted in the image. Selecting the prominence presentation context for the image can include determining that the first text block is displayed more prominently within the image than the second text block; and selecting a dominant-secondary block context from the prominence presentation contexts in response to the determination. The dominant-secondary block context can correspond to a user interface that presents a language translation of a dominant block of text.

Presenting additional information for at least a portion of the text depicted in the image using the identified user interface can include presenting a language translation of text included in the first text block in an overlay over the image. The overlay can be located over the first text block in the image.

Aspects can further include presenting a selectable user interface element in the dominant-secondary user interface at the depiction of the second text block in the image; and in response to receiving a selection of the selectable user interface element, presenting a language translation of text included in the second text block.

Determining that the first text block is displayed more prominently within the image than the second block of text can include determining that the text included in the first text block is larger than the text included in the second text block; and determining that the first text block is located closer to a center of the image than the second text block.

Identifying text depicted in the image can include identifying a first text block and a second text block that is different from the first text block. The first and second text blocks can be depicted in the image. Selecting the prominence presentation context for the image can include determining that the first text block is displayed at a substantially equal prominence within the image as the second text block; and selecting an equal prominence presentation context from the prominence presentation contexts in response to the determination. The equal prominence presentation context can correspond to a user interface that presents a language translation of multiple blocks of text having substantially equal prominence.

Presenting additional information for at least a portion of the text depicted in the image using the identified user interface can include presenting a language translation of text included in the first text block in a first overlay over the image, the first overlay being located over the first text block in the image; and presenting a language translation of text included in the second text block in a second overlay over the image, the second overlay being located over the second text block in the image.

Determining that the first text block is displayed at a substantially equal prominence within the image as the second text block can include determining that a size of the text included in the first text block is substantially equal to a size of the text included in the second text block.

In general, another aspect of the subject matter described in this specification can be embodied in methods that include the actions of receiving an image; identifying text depicted in the image, the identified text being in a text block depicted within the image, each text block being distinct from other text blocks in the image; selecting a collection presentation context from collection presentation contexts, wherein each collection presentation context corresponds to an arrangement of text blocks within images and each collection presentation context has a corresponding user interface for presenting additional information related to at least one text block, the selection of the collection presentation context being based on an arrangement of the text blocks depicted in the image; identifying a user interface that corresponds to the selected collection presentation context; and presenting additional information related to at least one of the text blocks using the identified user interface. Other embodiments of this aspect include corresponding systems, apparatus, and computer programs, configured to perform the actions of the methods, encoded on computer storage devices.

These and other embodiments can each optionally include one or more of the following features. Selecting a collection presentation context from the collection presentation contexts can include determining that each of the text blocks are related to each other based on a comparison of text of each text block to text of each other text block; and selecting a single collection presentation context in response to the determination. The single collection presentation context can have a corresponding user interface that presents a language translation of each text block in one or more overlays over the image.

Selecting a collection presentation context from the collection presentation contexts can include determining that two or more of the text blocks are not related to each other based on a comparison of text of each text block to text of each other text block; and selecting a multiple item presentation context in response to the determination, the multiple item presentation context having a corresponding user interface that presents a language translation of each text box in a separate display page in response to the determination.

The corresponding user interface can include a user interface element for each text block. The corresponding user interface can present a language translation for a particular text block when the particular text block's user interface element is selected.

Selecting a collection presentation context from the collection presentation contexts can include determining that a background color of each text block substantially matches a background color of each other text block; determining that the text blocks are related to each other based on the determination that the background colors substantially match; and selecting a single collection presentation context in response to the determination. The single collection presentation context can have a corresponding user interface that presents a language translation of each text block in one or more overlays over the image.

Selecting a collection presentation context from the collection presentation contexts can include comparing a size and position of each text block to a size and position of each other text block; determining that the text blocks are related based on the comparison; and selecting a single collection presentation context in response to the determination. The single collection presentation context can have a corresponding user interface that presents a language translation of each text block in one or more overlays over the image.

Determining that the text blocks are related can include determining that the size of the text blocks are substantially similar and that each pair of adjacent text blocks are spaced apart at a substantially similar distance within the image as each other pair of adjacent text blocks.

Selecting a collection presentation context from the collection presentation contexts can include identifying a first set of similar text blocks based on an arrangement of the first set of text blocks; identifying a second set similar text blocks based on an arrangement of the second set of text blocks, the second set of text blocks being different from the first set of text blocks; and selecting a multiple collections presentation context in response to the identifying the first and second sets of text blocks, the multiple collections presentation context corresponding to a user interface that presents additional information for first set of similar text blocks separate from additional information for the second set of text blocks.

Aspects can further include translating text of at least one of the text blocks and determining a readability measure of the translated text based at least on a number of characters of the translated text. The user interface can be selected based on the readability measure.

Aspects can further include determining that the image is an image of a menu and determining that each text block is associated with a particular item in the menu. Selecting the user interface can include selecting a user interface that presents a translation of each particular text block in an overlay over the particular text block.

Aspects can further include, for each text block: identifying a price in the image that corresponds to the text block, the price being presented in a particular currency; converting the price to a currency different from the particular currency; and presenting the converted price in an overlay over or near the identified price.

Particular embodiments of the subject matter described in this specification can be implemented so as to realize one or more of the following advantages. Translations of text depicted in an image (or other information related to text identified in the image) can be presented in a way that is more easily readable in the context of the image. User interfaces for presenting translations of text can be selected dynamically based on a presentation context for an image so that the translation is presented in a manner that is useful to the user. The readability and clarity of translations can be improved by using readability measures to select user interfaces that enable the translations to be presented in a more readable form. When multiple text blocks are identified in an image, a user interface may enable the user to quickly and easily navigate between translations of the different text blocks.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
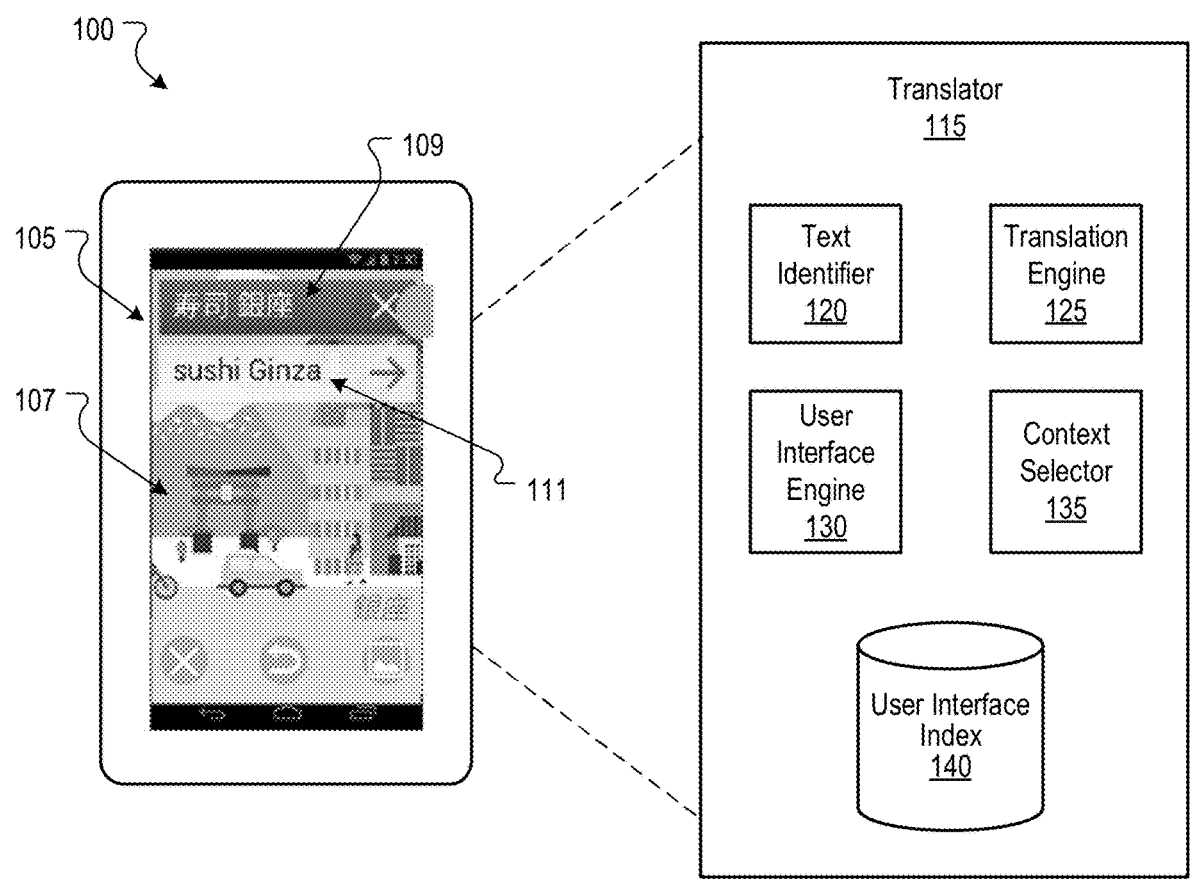
FIG. 1 is a block diagram of an example user device that presents additional information related to text depicted in an image.

A system can identify text depicted in an image, translate the text, and present a translation of the text in a manner that is useful to a user. Simply presenting a translation of all text depicted by an image may be confusing to a user when the image depicts multiple different text blocks, however. For example, an image may depict signs for several different stores in a mall. A user interface that presents a translation of each sign in a single block of text may confuse a user as the user may not be able to identify where the name of one store ends and the name of another begins. Furthermore, automatically presenting all translations may result in a cluttered display, which degrades the user experience.

The system can determine how to present translations based on the arrangement and/or other visual characteristics of the text within the image. For example, the system may consider characteristics of the text depicted by the image, such as the proximity of multiple text blocks with one another, alignment between the text blocks, similarity between text (e.g., font size, family, style, color, background color, etc.), grouping of multiple text blocks in one or more collections, and/or confidence levels in text recognition in determining what text to translate and how to present the translated text. These and other characteristics described herein can provide insight into the context of the image and its text. For example, the relative position of text blocks with respect to the center or focal point of the image can indicate the text in which the user is most interested.

In some implementations, the system can select a presentation context from multiple presentation contexts based on, for example, an arrangement and/or other visual characteristics of text within the image. The multiple presentation contexts can include one or more prominence presentation contexts, one or more collection presentation contexts, and/or one or more map presentation contexts. A prominence presentation context is a context in which one or more text blocks are depicted prominently within the image. For example, a single text block may be located near the center of the image, or two similarly prominent text blocks may be positioned a similar distance from the center of the image. A collection presentation context is a context in which multiple distinct text blocks are depicted in an image. For example, an image of a restaurant menu may be classified as a collection presentation context as each menu item may be considered an individual text block that is related to each other menu item depicted in the image. A map presentation context is a context in which one or more addresses or other information identifying a location is depicted in the image.

The system may select a user interface for presenting additional information related to text depicted in an image based on the selected presentation context. For example, the system may select between multiple user interfaces for prominence presentation contexts, multiple user interfaces for collection presentation contexts and/or multiple user interfaces for map presentation contexts based on the selected presentation context for the image. Each type of presentation context may have a different set of rules or a different process for selecting a user interface for images identified as having that type of presentation context.

Example User Device

FIG. 1 is a block diagram of an example user device 100 that presents additional information related to text depicted in an image. The user device 100 is an electronic device that is capable of capturing and/or presenting digital pictures and images. Example user devices 100 include personal computers, mobile communication devices (e.g., smartphones), tablet computers, and other devices that can capture and/or present images. To present the images, the user device 100 includes a display 105, such as a liquid-crystal display ("LCD"), touch screen, or other type of display. In this example, the display 105 is presenting a user interface for presenting a translation 111 of text 109 identified in an image 107.

The user device 100 includes a translator 115 that enables a user to capture images of objects, such as signs, menus, and billboards, and receive a translation of text depicted by the objects. The translator 115 includes a text identifier 120 that can identify text in images and other types of documents. In some implementations, the text identifier 120 analyzes images using optical character recognition ("OCR") to identify text depicted by the images. The text identifier 120 can detect text in multiple different languages. For example, the text identifier 120 may include an OCR engine that is capable of recognizing text in multiple languages, or an OCR engine for each of multiple different languages.

The text identifier 120 can also detect characteristics of the text, such as text color, background color, text size, font type, and/or location of the text within the image. These characteristics can be used, for example, to identify distinct text blocks. For example, the text identifier 120 may determine that two portions of text depicted in an image are included in two distinct text blocks based on the two portions of text having different font colors, different background colors, or being spaced apart from one another (e.g., being at least a threshold distance apart). The text identifier 120 can send data regarding the identified text to a translation engine 125 of the translator 115. This data can specify the text itself and the identified characteristics of the text.

The translation engine 125 can translate the text (or at least a portion thereof) to a different language. For example, the translation engine 125 may translate the text 109 (in Chinese) to a spoken language of a user associated with the user device 100 or another language selected by the user. The user may specify the language using a user interface, as described in more detail below. In this example, the text 109 has been translated to English and the English translation 111 of the text 109 is presented to the user. In some implementations, the translation engine 125 may translate only a portion of the text as specified by the user device 100 or by a user interface engine 130 of the user device 100. For example, the user device 100 may select one or more text blocks for translation. In addition, the translation engine 125 can, in some implementations, translate currency values from one currency to another. For example, the translation engine 125 may translate monetary amounts depicted in a foreign currency to a currency specified by the user.

The user interface engine 130 can select a user interface for presenting additional information about text identified in an image. The additional information can include a language translation of text identified in the image, a currency translation of a monetary amount identified in the image (e.g., a price identified in an image of a restaurant menu), and/or other information related to the text. The user interface can define how the additional information is presented. For example, as shown in FIG. 1, a translation 111 can be presented in an overlay over the image 107. In other user interfaces, a translation may be presented in a separate screen that only shows text, for example, due to the translation containing too much text to present in an overlay. The user interface engine 130 can select a user interface from a set of user interfaces based on a presentation context identified or selected for the image. As described below, a context selector 135 can select the presentation context for the image based on an arrangement or other characteristics of text depicted by the image.

A user interface index 140 can store a mapping of presentation contexts with user interfaces. For example, the user interface index 140 may include information identifying user interfaces for prominence presentation contexts, user interfaces for collection presentation contexts, and/or user interfaces for map presentation contexts. The user interface engine 130 can access the user interface index 140 to identify the appropriate user interface for a particular presentation context that has been selected for an image, generate the user interface for presentation on the user device 100, and present additional information for the text (e.g., a translation of the text) depicted by the image using the user interface. Example user interfaces for various presentation contexts are illustrated in FIGS. 2-8, 10-12 and 14, and described in detail below.

The user interface engine 130 can also use a readability measure associated with the additional information to select a user interface for presenting additional information related to text depicted in an image. The readability measure can indicate how readable the additional information would be if presented using a particular user interface. The readability measure for a user interface and for particular additional information can be based on a number (or percent) of characters of the additional information that can be presented using the user interface. For example, a user interface that can only display 10% of the additional information may have a low readability measure, and therefore may not be used to present the additional information.

The user interface engine 130 can select a user interface for an image by comparing the readability measures for the additional information for each of multiple suitable user interfaces. For example, assume that the selected user interface context for an image is a particular prominence presentation context. The user interface engine 130 may determine the readability measure for the additional information related to text depicted by the image with respect to each user interface available for the particular prominence context. The user interface engine 130 may select from the available user interfaces based on the readability measures. For example, the user interface engine 130 may select the user interface having the highest readability measure.

By way of another example, the user interface engine 130 may identify a preferred user interface for the selected presentation context and determine a readability measure for the additional information with respect to the preferred user interface. For example, the preferred user interface may present a translation of text in an overlay over the image. The user interface engine 130 may compare the readability measure to a readability threshold for the preferred user interface. If the readability measure satisfies the readability threshold (e.g., by meeting or exceeding the readability threshold), the user interface engine 130 may select the preferred user interface and present the translation in the overlay over the image. If the readability measure does not satisfy the readability threshold, the user interface engine 130 may select an alternative user interface, such as one that presents the translation in a separate screen that enables the user to browse or scroll through multiple screens or pages to view the translation.

The context selector 135 can select the presentation context for the image based on an arrangement and/or other characteristics of text depicted by the image. The presentation context for the image can be selected from multiple presentation contexts. For example, the presentation context may be selected from one or more prominence presentation contexts, one or more collection presentation contexts, one or more map presentation contexts, and/or other types of presentation contexts. The prominence presentation contexts can include a "single block context" for images in which a single block of text is depicted, a "dominant-secondary context" for images in which a particular text block is depicted more prominently than other text blocks, and/or an "equal prominence context" in which two or more text blocks are depicted with substantially equal prominence (e.g., the text blocks have prominence scores that are within a threshold amount of each other). The collection presentation contexts can include a "single collection" context for images in which multiple related text blocks are depicted, a "multiple collections" context for images in which multiple groups of related text blocks are depicted, and/or an "integrated" context for images in which a translation of the text blocks should be presented together.

Each of the presentation contexts and techniques for determining how the presentation contexts are selected for particular images are described in detail below. In particular, a prominence context is described with respect to FIGS. 3-8 and a process for handling a prominence context is described with reference to FIG. 9; a collection context is described with respect to FIGS. 10-12 and a process for handling a collection context is described with reference to FIG. 13; and a map context is described with respect to FIG. 14 and a process for handling a map context is described with reference to FIG. 15. Finally, a process for processing an image and selecting from among various contexts and processing the selected context accordingly is described with reference to FIG. 16.

Although the example user device 100 is illustrated as including the text identifier 120, the translation engine 125, the user interface engine 130, the context selector 135, and the user interface index 140, one or more of these elements can be stored on and/or executed by another device, such as a server in communication with the user device 100. For example, the user device 100 may transmit an image to a server by way of a communication network (e.g., LAN, WAN, or Internet). The server may process the image to select a presentation context and user interface for the image and send data to the user device 100 that causes the user device 100 to present additional information related to text depicted in the image using the selected user interface.

Example Translation User Interface

Figure 2:
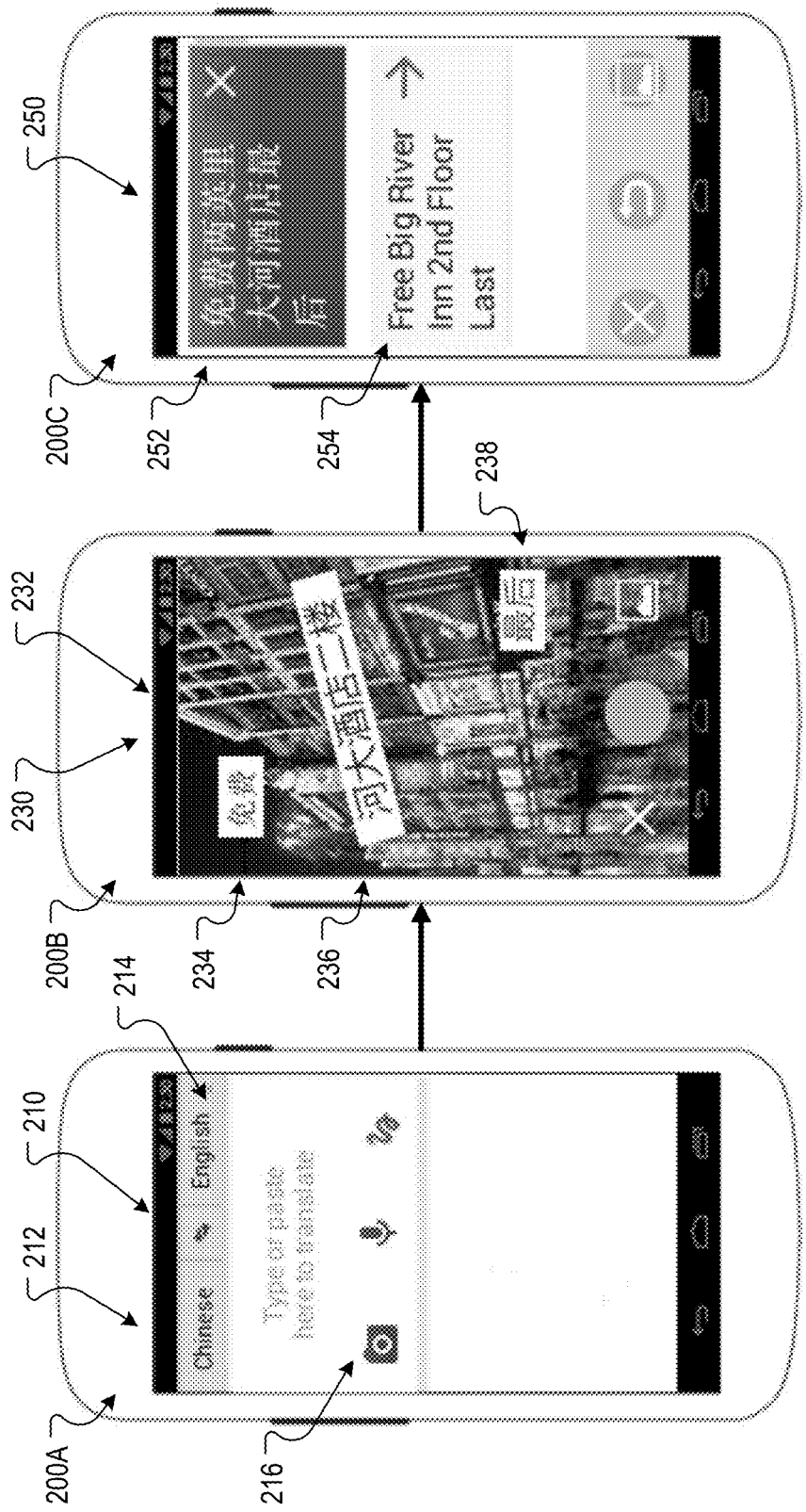
FIG. 2 depicts screen shots of example user interfaces for capturing an image and presenting a language translation of text depicted in the image.

FIG. 2 depicts screen shots 200A-200C of example user interfaces for capturing an image and presenting a language translation of text depicted by the image. In the example screen shot 200A, a user interface 210 enables a user to select languages for translation. In particular, the user interface 210 enables the user to select an original language 212 in which text is to be found in an image and a translation language 214 in which the text is to be translated. In this example, the user has selected an original language 212 of Chinese and a translation language 214 of English. Thus, in this example, the user wants to translate Chinese text found in an image to English text. The user interface also includes a camera button 216 that, when selected by the user, causes the user device to capture an image using a camera installed on or communicably coupled to the user device.

In the screen shot 200B, a user interface 230 depicts an image 232 captured by the user device, for example, in response to selection of the camera button 216. The example image 232 includes several portions of text in Chinese characters that have been identified by the user device and highlighted with a white background. In particular, the image 232 includes a first portion of text 234 located near the top left corner of the image 232, a second portion of text 236 located near the center of the image 232, and a third portion of text 238 located near the bottom right of the image 232. Each portion of text 234-238 is depicted on a separate sign in the image 232.

Figure 4:
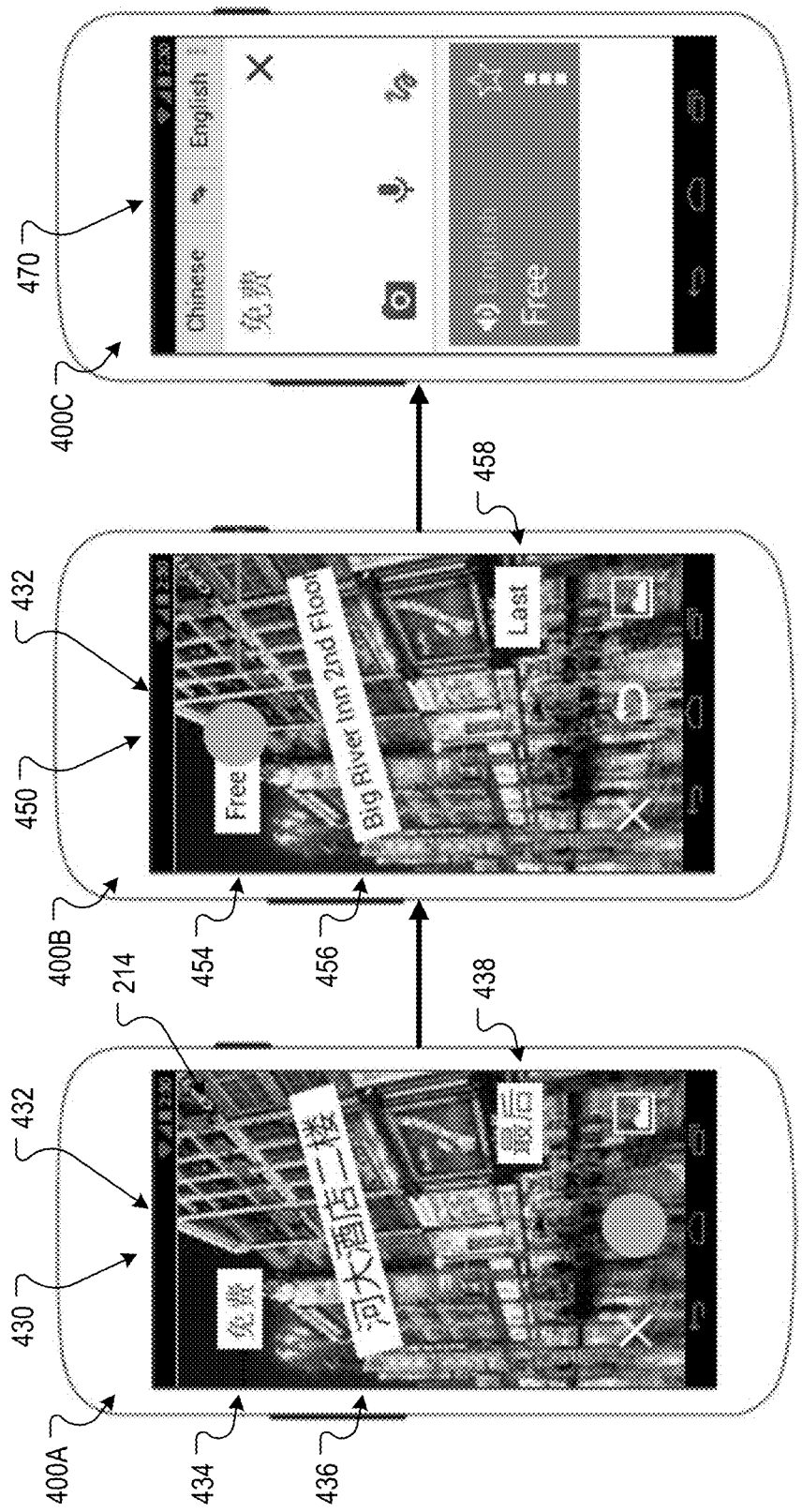
FIG. 4 depicts screen shots of example user interfaces for presenting a language translation of text depicted in the image.
Figure 5:
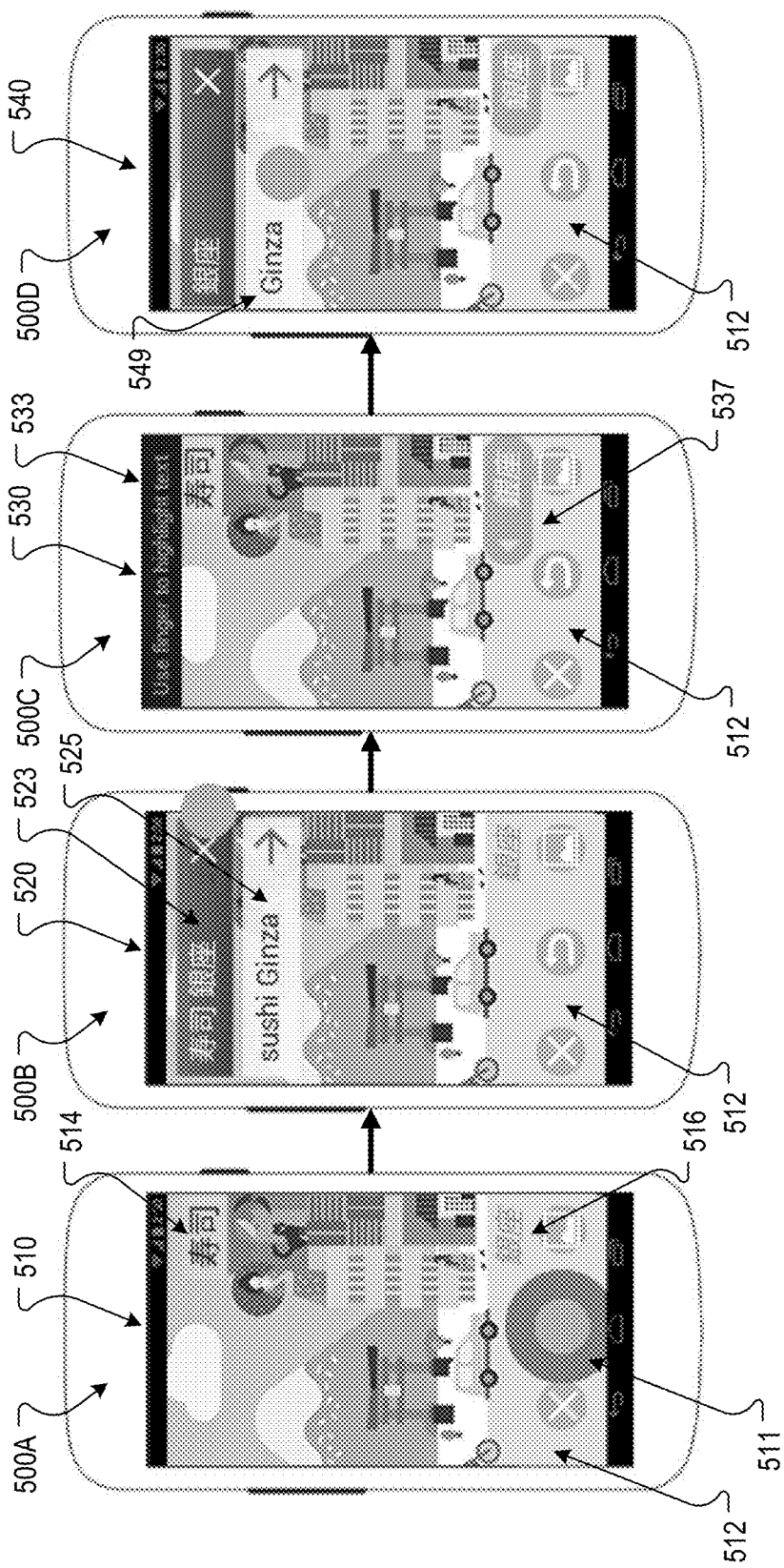
FIG. 5 depicts screen shots of example user interface for capturing an image and presenting a language translation of text depicted in the image.

A translation screen user interface 250 is depicted in the screen shot 200C. The translation screen user interface 250 depicts the text 252 identified in the image 232 and an English translation 254 of the text 252 identified in the image 232. The first portion of text 234 has been translated to the word "Free"; the second portion of text 236 has been translated to "Big River Inn 2nd Floor"; and the third portion of text 238 has been translated to the word "Last." In this example user interface 250, the text 252 has been translated as if the text 252 was included in a single text block although the text 252 was depicted in separate distinct text blocks. As can be seen by the translated text 254, translating multiple distinct text blocks as one can result in a nonsensical translation that may confuse or frustrate users. By evaluating the arrangement and/or visual characteristics of text depicted by the image and selecting a context for text depicted by an image, more meaningful translations can be provided. For example, FIGS. 3-5 illustrate user interfaces that can better present translations of the text 252 based on an analysis of the prominence of each portion of text.

Prominence Presentation Contexts and User Interfaces

The prominence of text within an image can be used to determine which text to provide a translation (or other information) as users often focus their cameras on the object in which they are interested. By evaluating the prominence of the text, the translator 115 can determine which text in which the user likely wants to obtain a translation and provide a translation of that text. For example, a user may take a picture of text on a particular sign to obtain a translation of the sign. In the picture, there may be other signs in the background, while the particular sign is near the center of the picture. By evaluating the prominence of the text, the translator can identify the text of the particular sign for translation as this text is depicted more prominently than the text of the background signs. The translator 115 may also determine to not translate the text of the background signs as the user may not be interested in translations of those signs.

Figure 3:
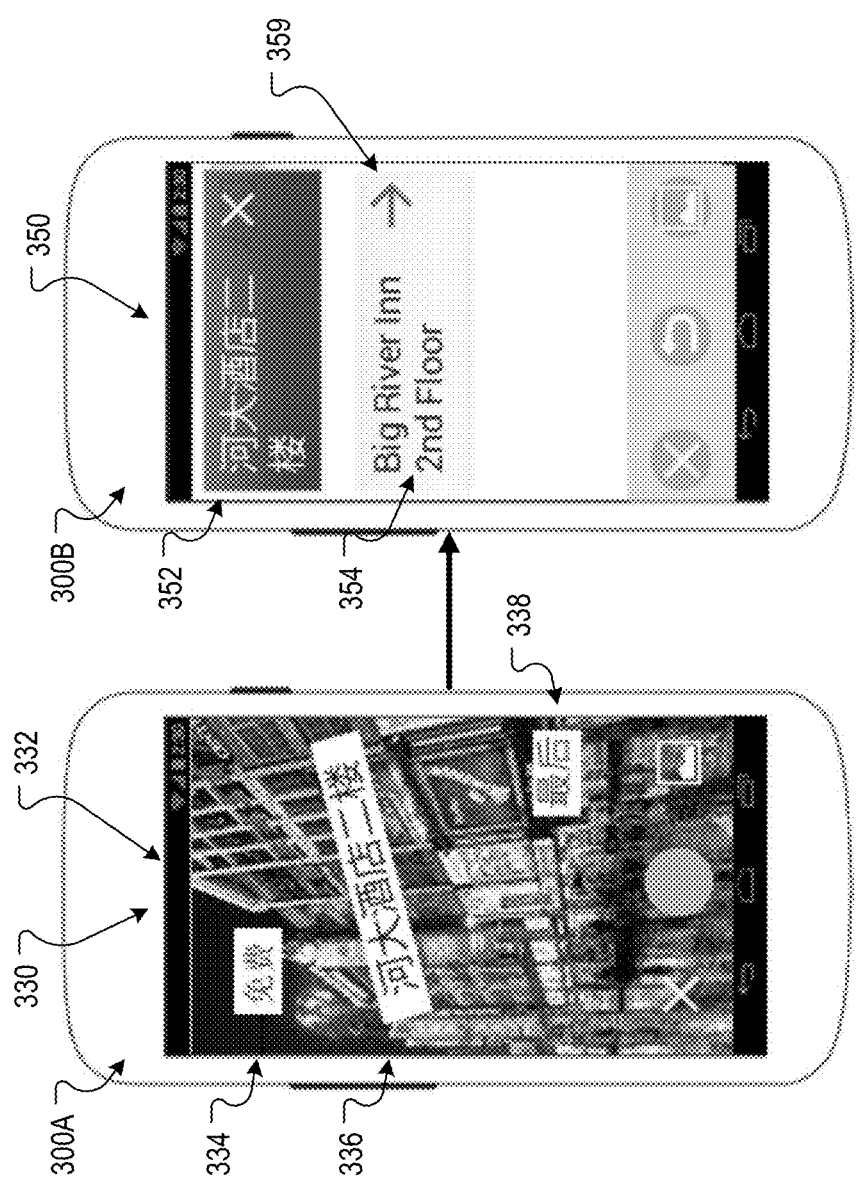
FIG. 3 depicts screen shots of example user interfaces for capturing presenting a language translation of text depicted in the image.

FIG. 3 depicts screen shots 300A and 300B of example user interfaces for presenting a language translation of text depicted in an image. The screen shot 300A is similar to the screen shot 200B, and includes a user interface 330 that presents an image 332 that includes several portions of text 334-338 in Chinese characters that have been identified by a user device and highlighted with a white background.

A translation screen user interface 350 is depicted in the screen shot 300B. Rather than presenting a translation of all of the text depicted in the image 332 as if it was included in one text block, the example translation screen user interface 350 presents only a portion of text 352 that was identified in the image 332 and an English translation 354 of the portion of text 352. In particular, the translation screen user interface 350 presents the second portion of text 336 and an English translation 354 of the second portion of text 336 ("Big River Inn 2nd Floor").

The translation screen user interface 350 also includes a control 359 that enables a user to browse additional information. The control 359 may be configured to navigate between screens that include translations for each portion of text 334-338 or to obtain other information for each translation. For example, in response to a selection of the control 359, the user device may display another screen that presents a translation of the third portion of text 338. Another selection of the control 359 may cause the user device to display a screen that presents a translation of the first portion of text 334. Yet another selection of the control 359 may cause the user device to return to the present screen that presents the translation 354.

In this example, a translator, such as the translator 115 of FIG. 1, has selected the second portion of text for translation based on the prominence of the second portion of text 336 relative to the prominence of the first portion of text 334 and the prominence of the third portion of text 338. For example, the translator 115 may identify that the each portion of text belongs to a distinct text block based on the relative positions of the portions of text and the orientation of the portions of text. Based on this determination, the translator 115 may determine that the presentation context is a prominence presentation context and evaluate the prominence of each portion of text. As the second portion of text is displayed near the center of the image and with a larger font than the other two portions of text, the translator 115 may determine that the second portion of text 336 is presented more prominently than the other two portions of text and automatically translate the second portion of text 336 in response to the determination.

By presenting a translation of only the most prominent text, the user device is more likely to provide the user with the translation sought by the user because users typically focus their camera such that the desired content is at or near the center of the captured image. This also avoids confusing the user with translations of text that may be in the background and unintentionally captured by the user. For example, the first and third portions of text 334 and 338 may have been captured unintentionally by the user while the user was attempting to capture an image of the second portion of text 336 for translation.

In addition to automatically translating the more prominent text, the translator 115 may also select a presentation context for the image and a user interface for presenting the translation based on the selected presentation context. In this example, the translator 115 may select a dominant-secondary context for the image 332 as the translator 115 has determined that the image 332 includes a more prominent text block (or dominant text block) that includes the second portion of text 336 and two secondary text blocks that include the first and second portions of text 334 and 338, which are depicted less prominently in the image 332 than the second portion of text 336.

The user interfaces for a dominant-secondary context may include, for example, a translation screen user interface that presents a translation of the most prominent text depicted in the image (e.g., the user interface 350); a user interface that presents, on the image, an overlay that includes a translation of the most prominent text without presenting a translation of secondary text blocks; a user interface that presents, on the image, an overlay that includes a translation of the most prominent text block and a user interface element that, when selected, presents a translation of secondary text blocks; and/or a user interface that presents, on the image, an overlay for each text block that presents a translation of the overlay's corresponding text block.

For example, FIG. 4 depicts screen shots 400A and 400B of example user interfaces for presenting language translations of text blocks in overlays over the image. The screen shot 400A is similar to the screen shot 200B, and includes a user interface 430 that presents an image 432 that includes a first portion of text 434 located near the top left corner of the image 432, a second portion of text 436 located near the center of the image 432, and a third portion of text 438 located near the bottom right of the image 432. Rather than presenting the translation of the second portion of text in a separate screen without the image 432, a user interface 450 depicted in the screen shot 400B presents the image 432 and overlays 454-458 over the image 432 that each includes a translation of text depicted by the image 432. In particular, the overlay 454 presents a translation of the first portion of text 434; the overlay 436 presents a translation of the second portion of text 456; and the overlay 458 presents a translation of the third portion of text 438. In this example, the overlays 454-458 are each located above (or in place of) the text for which the overlay corresponds. This makes it easy for a user to use the translations to determine the subject of each sign in the image 432. For example, a user walking down the street depicted in the image 432 could easily look at the user interface 450 and determine where the Big River Inn is located on the street.

Each overlay 454-458 can include, or be associated with, a selectable icon that enables the user to obtain additional information related to the translated text. For example, the screen shot 400C depicts a user interface 470 that enables a user to listen to the pronunciation of text in either the original language or the translated language. Other information related to the text could also be presented, such as a definition for a word included in the text or information related to an entity identified by the text. The user interface 470 can be presented in response to a user selecting a user interface element associated with the overlay 454.

In some implementations, a user interface for a dominant-secondary context may initially include an overlay for the most prominent text only, rather than overlays for less prominent text blocks. Such a user interface may provide a user interface element that enables the user to request a translation of secondary text blocks depicted in the image. For example, FIG. 5 depicts screen shots 500A-500D of example user interfaces that enable a user to select text for translation.

In the screen shot 500A, a user interface 510 includes a camera button that, when selected, causes a user device to capture an image 512. The example image 512 includes two distinct text blocks 514 and 516 that include Japanese text. In the screen shot 500B, a user interface 520 presents the text of both text blocks 514 and 516 in a single text block 523 over the image 512. The user interface 520 also presents a translation of both text blocks 514 and 516 in a text block 525 over the image 512. A translator, such as the translator 115 of FIG. 1, may translate the text of the two text blocks automatically for the user interface 520 in response to identifying the text blocks 514 and 516. Alternatively, the translator 115 may translate only the text of the text block 514 as it is displayed more prominently in a larger font. Or, the translator 115 may not translate either text block 514 or 516 in response to determining that neither text block is displayed prominently as both text blocks 514 and 516 are located in corners of the image. A process for determining prominence of text blocks depicted by an image is described in detail below with reference to FIG. 9.

In the screen shot 500C, a user interface 530 provides instructions 533 for the user to select text for translation. In this example, the user has highlighted the text in the text block 516 for translation. In response, the translator 115 can identify a translation for the selected text and provide the translation in an overlay. For example, the screen shot 500D depicts a user interface 540 that presents the translated text in an overlay 549 over the image 512 in response to the user selection of the text in text block 516. The user can also select the overlay 549 to request additional information related to the translated text.

In some implementations, a user interface may provide a user interface element that can be dragged to text that the user would like translated. For example, the user interface element may be displayed at a touch screen device and the user can drag the user interface element to the desired text. In response, the user device may request a translation of the text from the translator 115 and present the translation using a user interface selected by the translator 115.

Figure 6:
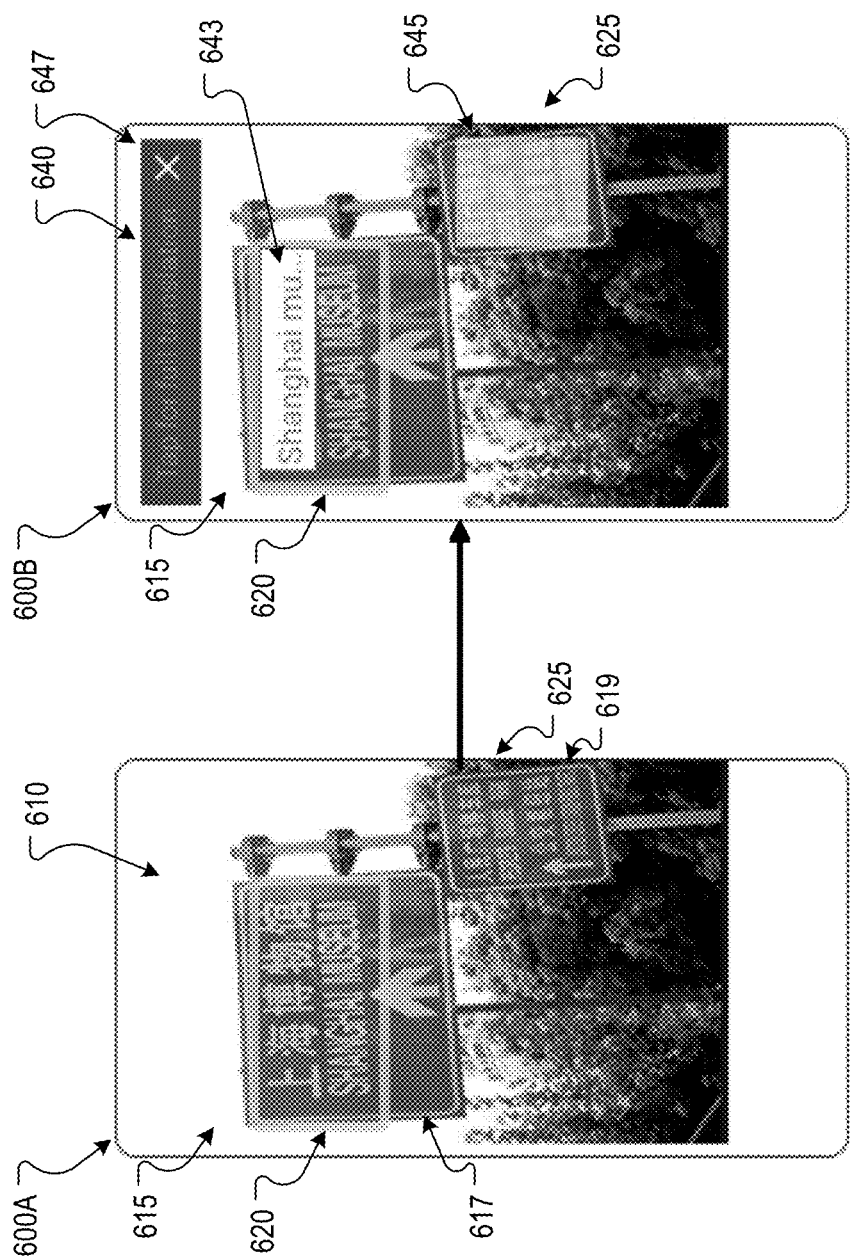
FIG. 6 depicts screen shots of example user interfaces for presenting a language translation of text depicted in the image.

FIG. 6 depicts screen shots 600A and 600B of example user interfaces that provide a translation for prominent text and enables a user to select secondary text for translation. In screen shot 600A, a user interface 610 depicts an image 615 of two street signs 617 and 619. Each street sign 617 and 619 depicts text in Chinese characters. To translate text in the image 615 from Chinese characters to English, the translator 115 may identify text blocks in the image that include Chinese characters. For example, the translator 115 may identify the Chinese characters in the street sign 617 as a text block 620 and identify the Chinese characters in the street sign 619 as a text block 625.

To determine which text to translate and how to present the translated text, the translator 115 may evaluate the prominence of each identified text block 620 and 625. In this example, the translator 115 may determine that the text block 620 is depicted more prominently than the text block 625 as the text block 620 is closer to the center of the image 615 than the text block 625. In addition, the text size for the text block 620 is larger than the text size for the text block 625.

In response to determining that the text block 620 is depicted more prominently than the text block 625, the translator 115 may determine to automatically translate the text of the text block 620, while not automatically translating the text of the text block 625. As shown in the screen shot 600B, the translator 115 may select a user interface 640 that presents a translation of the text block 620 in an overlay 643 over (or in place of) the Chinese characters of the text block 620 in the image 615.

In this example, the complete translation does not fit in the overlay 643. The user interface 640 can provide a user interface element 647 that, when selected, causes the user interface 640 to present the full translation. In some implementations, the translator 115 may determine that a readability measure for the translation does not meet a threshold and, in response, present the translation in another screen rather than presenting a partial translation.

The user interface 640 may also provide a user interface element, such as a highlighted block, at secondary text that was not automatically translated. For example, the user interface 640 includes a user interface element 645 to highlight the non-translated text block 625. In response to user selection of the user interface element 645, the user interface 640 may present a translation of the text included in the text block 625. This translation may be presented in an overlay over the street sign 619 or the text block 625, or in a separate screen or user interface.

Some images may depict a single block of text in a prominent manner. For example, a user may use a user device to capture an image of instructions or a single sign to obtain a translation of the instructions or sign. In such cases, the translator 115 may identify the text and automatically present a translation of the text in a particular user interface. For example, the translator 115 may select a single block context for an image in response to determining that the image depicts a single prominently displayed text block. User interfaces for a single block context may include a user interface that presents a translation of the text included in the single text block in an overlay over the image, a user interface that presents a translation of the text included in the single text block in a separate screen without the image, such as one that enables the user to browse or scroll through the translated text, and/or other types of user interfaces.

Figure 7:
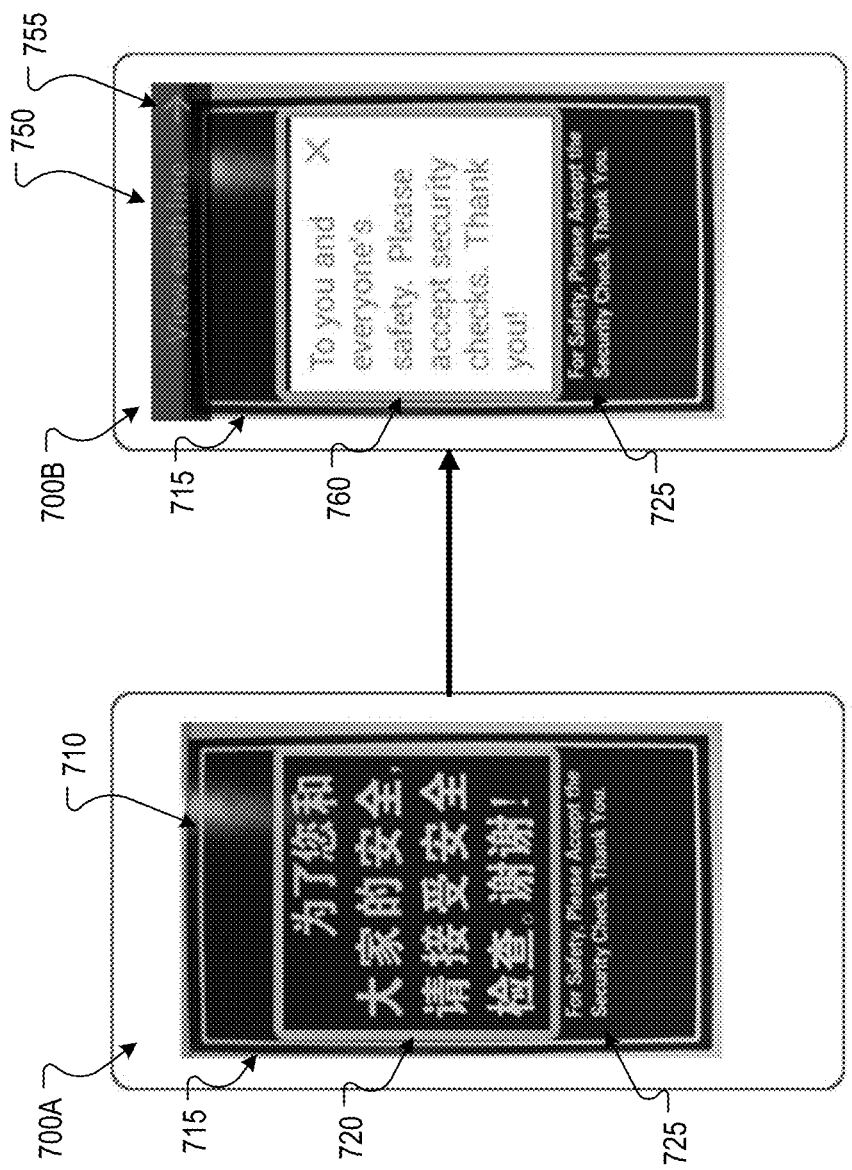
FIG. 7 depicts screen shots of example user interfaces for presenting a language translation of text depicted in the image.

FIG. 7 depicts screen shots 700A and 700B of example user interfaces for presenting a language translation of text depicted in an image. The screenshot 700A depicts a user interface 710 that presents an image 715. The image 715 depicts a text block 720 having Chinese characters and a text block 725 having English characters. In this example, the user has requested a translation from Chinese to English. Thus, the translator 115 may analyze the image to identify any Chinese characters and identify the text included in text block 720, while ignoring the English characters in the text block 725. The translator 115 may further analyze the text included in the text block 720 to determine that the text block 720 is a single text block that includes text that is related to each other. For example, the translator 115 may compare the text size, text color, background color for the text, location and proximity of the text, and/or other characteristics to determine that the text included in the text block 720 is related. In response, the translator 115 may select a single block context for the image and identify a user interface based on the selection.

As shown in the screen shot 700B, the translator 115 has selected a user interface 750 that presents a translation of the text block 720 in an overlay 760 over the image 715. The user interface 750 also includes a user interface element 755 that, when selected by the user, presents the translated text one line at a time. For example, the user may be able to browse each line of translated text where each line is presented in a separate display screen than each other line.

Some images may depict two or more blocks of text in equal or similar prominence. For example, a user may capture an image of two signs in order to determine which direction or which door to pass through. In such cases, it may be beneficial to present translations of both signs to help guide the user.

Figure 8:
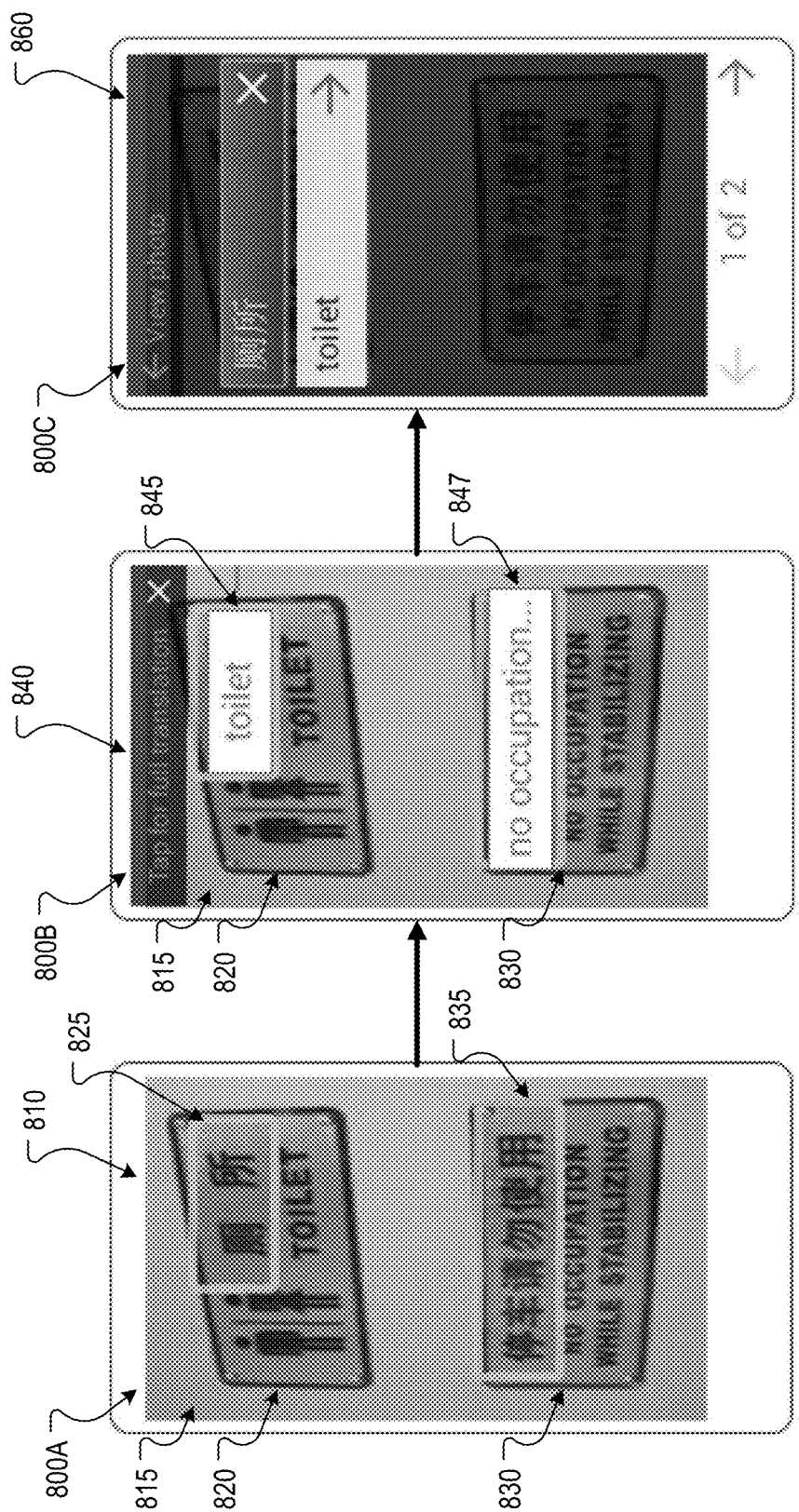
FIG. 8 depicts screen shots of example user interfaces for presenting a language translation of text depicted in the image.

FIG. 8 depicts screen shots 800A-800C of example user interfaces for presenting language translations of text blocks having similar prominence. In the screen shot 800A, a user interface 810 presents an image 815 that includes two signs 820 and 830 that include Chinese characters. In this example, the user is requesting the translation of Chinese characters to English. Thus, the translator 115 may identify the Chinese characters included in the sign 820 and the Chinese characters included in the sign 830. The translator 115 may also analyze the Chinese characters included in each sign 820 and 830 to determine that the Chinese characters of each sign are included in a distinct text block. For example, the translator 115 may identify the Chinese characters included in the sign 820 as a text block 825 and identify the Chinese characters included in the sign 830 as a text block 835 that is different from the text block 825.

In response to identifying multiple text blocks 825 and 835 in the image 815, the translator 115 may evaluate the prominence of the text blocks and determine that the text blocks 825 and 835 have similar prominence as the text size and color of each text block 825 and 835 is similar and the text blocks 825 and 835 are about the same distance from the center of the image 815. As the text blocks 825 and 835 have similar prominence, the translator 115 may select an equal prominence context for the image 815 and select a user interface that corresponds to the equal prominence context.

As shown in the screen shot 800B, a user interface 840 was selected to present the translations of the text blocks. The user interface 840 presents a translation of the Chinese characters of the text block 825 in an overlay 845 that is positioned over the sign 820 where the Chinese characters of the text block 825 were identified. Similarly, the user interface 840 presents a translation of the Chinese characters of the text block 835 in an overlay 847 that is positioned over the sign 830 where the Chinese characters of the text block 835 were identified. Each overlay 845 and 847 is also selectable to request a full translation of the overlay's corresponding text. For example, if a user selects the overlay 845, a full translation of the Chinese characters for "toilet" is presented in a user interface 860, as shown in the screen shot 800C.

A translator, such as the translator 115, may evaluate the arrangement and visual characteristics of text depicted by an image to select a prominence presentation context for the image. The translator 115 may also select a user interface for presenting additional information for at least a portion of the identified text. The user interface may be selected based on the selected prominence presentation context. For example, if a single block context is selected, a user interface that corresponds to the single block context may be selected and used to present the additional information.

Figure 9:
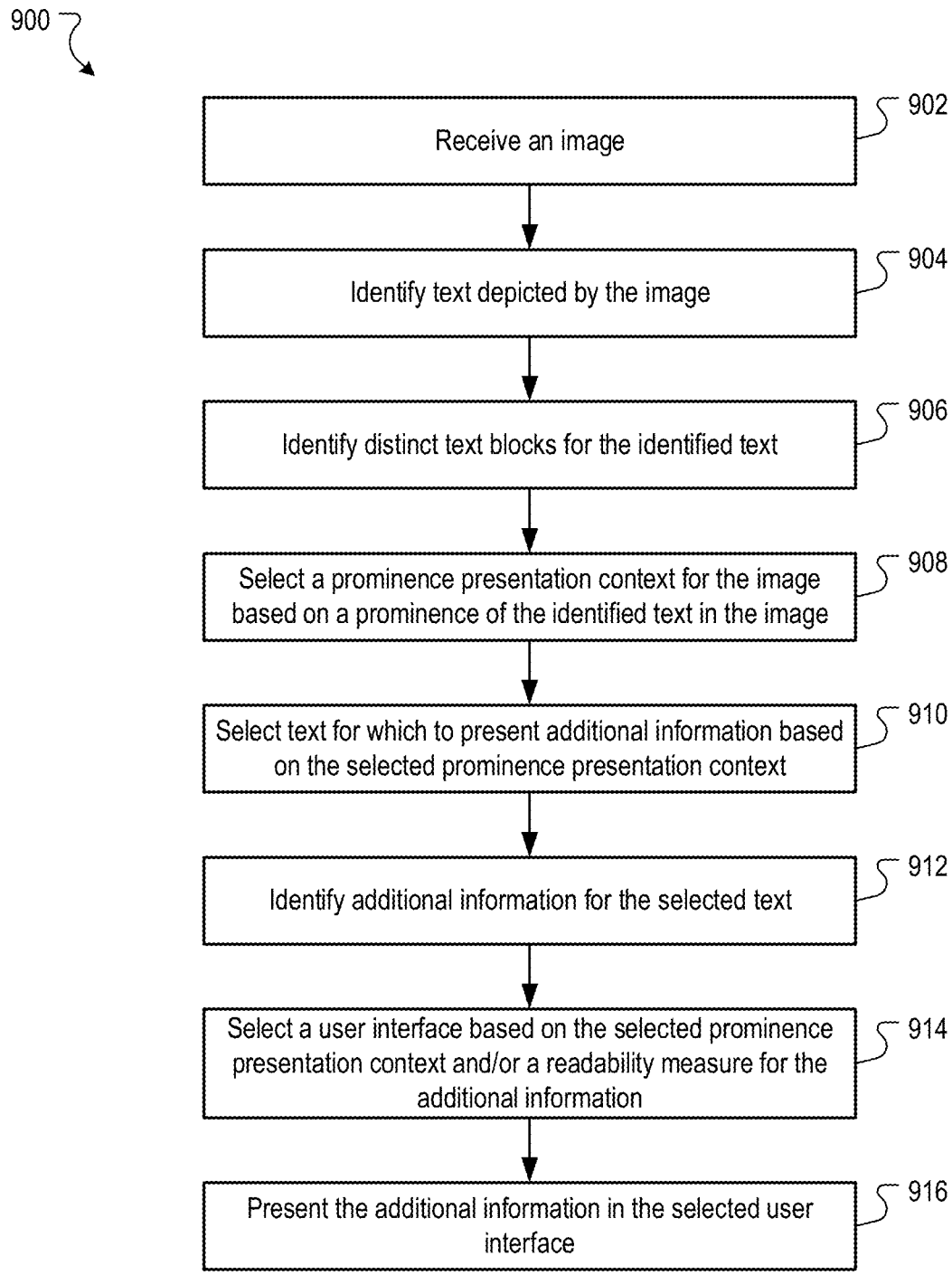
FIG. 9 is a flow chart of an example process for presenting additional information related to text depicted in an image based on a prominence presentation context selected for the image.

FIG. 9 is a flow chart of an example process 900 for presenting additional information related to text depicted in an image based on a prominence presentation context identified for the image. Operations of the process 900 can be implemented, for example, by a data processing apparatus, such as the user device 100 and/or the translator 115 of FIG. 1. The process 900 can also be implemented by instructions stored on computer storage medium, where execution of the instructions by a data processing apparatus cause the data processing apparatus to perform the operations of this process 900.

An image is received (902). For example, a user may take a picture of an object using a user device, such as a smartphone, tablet computer, or other user device. The sign may include text in a language foreign to the user, which is also depicted in the received image.

Text in the received image is identified (904). The text may be identified using OCR or another text identification technique. In some implementations, only text of a particular language is identified. For example, the user may specify that text of a particular language should be translated to another language, such as a language understood by the user. In this example, only text of the particular language may be identified in the image.

In addition to the actual text, characteristics (e.g., visual characteristics) of the text may be identified. These characteristics may include the color of the text, the color of the background under the text, the size of the text, the type of font for the text, and/or the location of the text within the image.

In some implementations, text that is clipped or otherwise incomplete may be ignored. For example, if only a portion of a sign is depicted by the image and the text of the sign includes an incomplete word, such as "sto" instead of "stop," the text of the sign may not be identified for providing additional information or for selecting a prominence presentation context for the image. Translating incomplete text may confuse the user or result in nonsensical translations.

One or more distinct text blocks are identified based on the identified text (906). Characteristics of the text can be evaluated to identify distinct text blocks. For example, text that is proximal (e.g., within a threshold distance) to other text and that has a similar appearance (e.g., similar size, text size, and/or background color) may be considered part of a text block A. Conversely, another portion of text that is far away (e.g., greater than a threshold distance) from text block A and that has a different text size, different text color, and/or different background color than the text of the text block A may be identified as another distinct text block B. The similarity of visual characteristics of two portions of text (e.g., text color, text size, font type, and/or background color) and a distance between the two portions of text can be used to determine whether the two portions of text belong to a common text block.

A prominence presentation context for the image is selected based on the prominence of the identified text (908). The prominence presentation context may be selected from multiple prominence presentation contexts. For example, the multiple prominence presentation contexts may include a single block context, a dominant-secondary context, and/or an equal prominence context.

To evaluate the prominence of one or more text blocks, a prominence score may be computed for each text block. The prominence score for a text block may be based on a location of the text block within the image, a size of text included in the text block, a number of characters of text included in the text block, a color of text included in the text block, a color of the background for the text block, and/or other factors that can be indicative of the prominence of a text block. The location can be an absolute location in the image (e.g., using a coordinate system) or a distance from the center of the image to a point of the text block (e.g., center of text block or point of the text block closest to the center of the image). For example, a text block that is closer to the center of the image may have a higher prominence score than a text block that is farther from the center of the image. Similarly, a text block having a large text size (or many characters) may have a higher prominence score than a text block having a smaller text size (or fewer characters). Additionally, brighter text or background colors may result in higher prominence scores than darker or duller texts or background colors.

If a single distinct text block is identified for the image, the single block context may be selected for the image. In some implementations, the prominence of the single distinct text block may be evaluated before selecting a single block context for the image. For example, if the single distinct text block is a small block of text in a corner of the image, the single distinct text block may have a low prominence score (e.g., a prominence score that is less than a prominence score threshold). In such cases, the single block context may not be selected and the text may not be automatically translated.

If multiple distinct text blocks are identified for the image, then the relative prominence of the text blocks may be evaluated to determine whether to select the dominant-secondary context or the equal prominence context. For example, a prominence score may be computed for each distinct text block and the prominence scores may be compared.

If a text block has a significantly higher prominence score than each other text block identified for the image, then a dominant-secondary context may be selected for the image. For example, if text block A has a prominence score that is at least a threshold amount greater than each other text block, then text block A may be considered a dominant text block and a dominant-secondary context may be selected for the image. If two or more text blocks identified for the image have similar prominence, then an equal prominence context may be selected for the image. For example, if text block B has a prominence score that is within a threshold amount of the prominence score for text block A and the prominence scores for text blocks A and B are greater than the prominence scores for any other text blocks identified for the image, then an equal prominence context may be selected for the image.

Text for which additional information is to be presented is selected based on the selected prominence presentation context (910). For example, if a single block context is selected for the image, the text included in the single distinct text block identified in the image may be selected for providing additional information. This additional information may be a language translation of the text included in the single distinct text block. If a dominant-secondary context is selected for the image, then the text included in the dominant text block (e.g., the text block having the greatest prominence) may be selected for providing additional information. If an equal prominence context is selected for the image, then the text included in the text blocks having the similar prominence may be selected for providing additional information.

Additional information is identified for the selected text (912). The additional information may include a language translation of the selected text. For example, the user may select a language in which the user wants text depicted by the image to be translated. For text that includes an amount in a currency, the additional information may include a conversion of the amount to a currency specified by the user. For example, if the selected text includes a price in Japanese yen, the additional information may include a dollar amount that corresponds to the price in yen.

A user interface is selected based on the selected prominence presentation context and/or a readability measure for the additional information (914). Each prominence presentation context may have one or more corresponding user interfaces that can be used (or are eligible to be used) to present additional information for text depicted in an image. In addition, the user interface(s) eligible for one prominence presentation context may be different from the user interface (s) for each other prominence presentation context.

The single block context may have a user interface that presents the additional information in an overlay over the image (e.g., the user interfaces of FIG. 7) and/or a user interface that enables the user to browse the additional information in one or more separate screens (e.g., the user interfaces of FIG. 3). Each separate screen may include controls that enable the user to browse to additional screens to view more of the additional information.

The dominant-secondary context may include a user interface that presents additional information for the most prominent text block depicted in the image (e.g., the user interfaces of FIG. 3); a user interface that presents, on the image, an overlay that includes additional information related to the most prominent text without presenting additional information for secondary text blocks; a user interface that presents, on the image, an overlay that includes additional information related to the most prominent text block and a user interface element that, when selected, presents additional information related to a secondary text block (e.g., the user interfaces of FIG. 6); and/or a user interface that presents, on the image, an overlay for each text block that presents additional information related to the overlay's corresponding text block (e.g., the user interfaces of FIG. 4).

The equal prominence context may include a user interface that presents additional information in overlays for each of the text blocks that have been identified as having equal prominence (e.g., the user interfaces of FIG. 7) and/or a user interface that enables the user to browse the additional information for the equal prominence text blocks (and any other text blocks identified in the image) in one or more separate screens (e.g., the user interfaces of FIG. 3).

Each prominence presentation context may have a preferred user interface for that context. For example, the preferred user interface may be one that presents the additional information in overlays over the image. By way of another example, the user may be able to select a preferred user interface for each prominence presentation context. The preferred user interface for a particular prominence presentation context may be selected in response to a selection of the particular prominence presentation context.

In some implementations, a readability measure for the additional information is used to select the user interface for presenting the additional information. As described above the readability measure can indicate how readable the additional information would be if presented to the user using a particular user interface. The readability measure for a user interface and for particular additional information can be based on a number of characters of the additional information that can be presented using the user interface. The readability measure may be equal to or proportional to a ratio between (a) the number of characters of the additional information that can be presented using the user interface; and (b) the total number of characters in the additional information. For example, an overlay may have a limited amount of space to present additional information. The amount of space may be based on the size of the text block for which the overlay is to present additional information. If only a portion of a translation is presented in an overlay, it may lead to user confusion. In such cases, it may be better to present the additional information in a separate screen where all, or at least more, of the translation can be presented.

The readability measure can be used to determine whether to use the preferred user interface (e.g., one with overlays over the image) for the selected prominence presentation context or to use an alternative user interface (e.g., one that enables a user to browse additional information). For example, if the readability measure for additional information with respect to the preferred prominence presentation context satisfies a readability threshold (e.g., by meeting or exceeding the readability threshold), the preferred user interface may be selected. If the readability measure for the additional information with respect to the preferred prominence presentation context does not satisfy the readability threshold (e.g., the readability measure is less than the readability threshold), an alternative user interface that allows for the presentation of more characters of the additional information may be selected.

The readability measure may be used to select between multiple user interfaces independent of a preferred user interface. For example, the user interface that is eligible for the selected prominence presentation context and that has the highest associated readability measure for the additional information may be selected to present the additional information.

The additional information is presented using the selected user interface (916). For example, the user device may generate the user interface and present the additional information using the selected user interface.

Collection Presentation Contexts and User Interfaces

Some images may have many distinct portions of text having various levels of prominence within the image. For example, an image of a restaurant menu may include a list of text for each menu item depicted in the image. In this context, it may be more beneficial to the user if collections of text blocks that are related are identified and translations (or other additional information) of each collection is presented together. For example, the user may want to view a translation of each menu item to determine which item to order, rather than only the menu item near the center of the image. At the same time, it may confuse the user to treat the menu items as one block of text, similar to the user interface 250 of FIG. 2. A translator, such as the translator 115 of FIG. 1, may evaluate the arrangement and/or visual characteristics of multiple text blocks in the image to determine how to present translations of the text blocks to the user, as described in more detail with reference to FIGS. 10-13.

Figure 10:
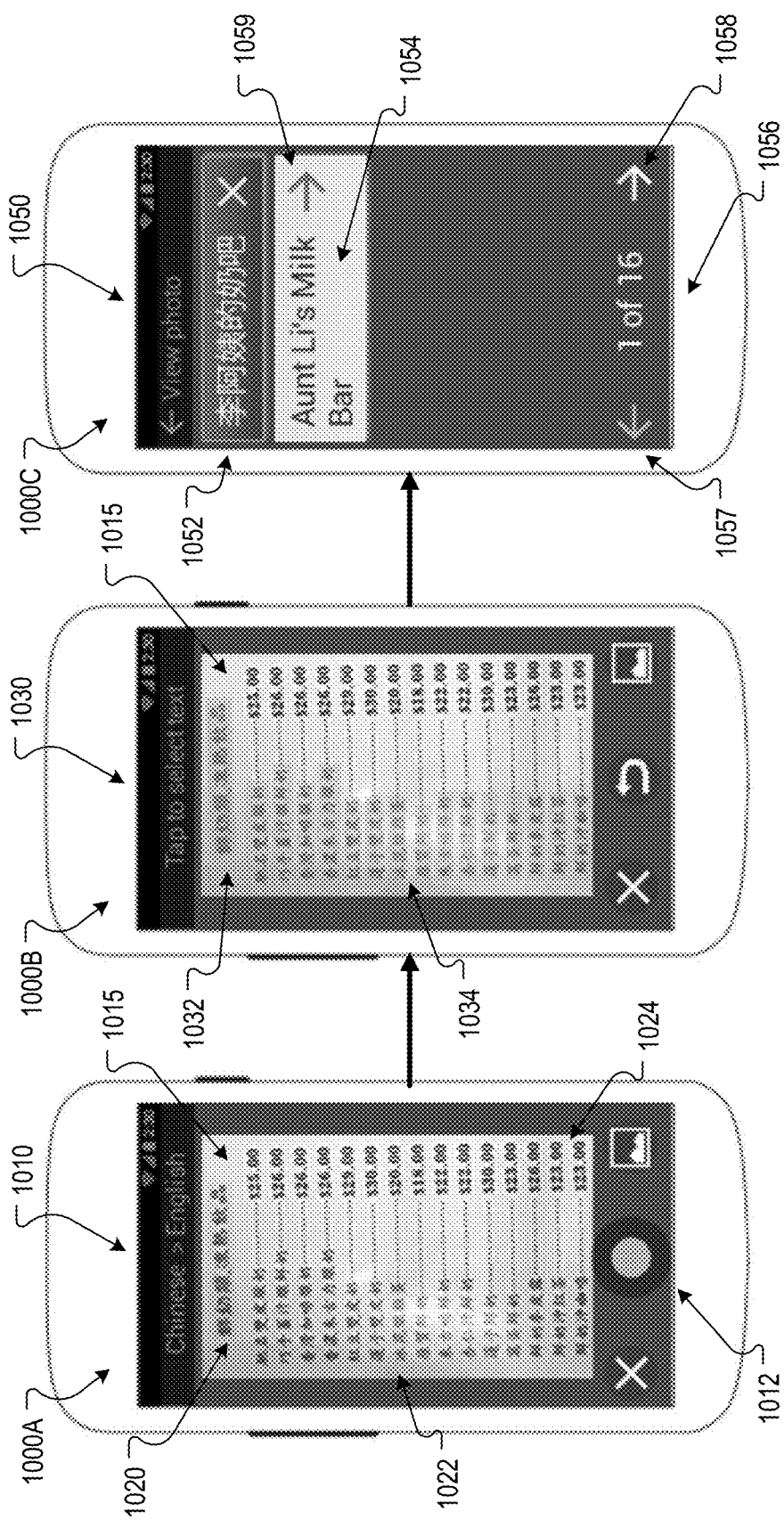
FIG. 10 depicts screen shots of example user interfaces for presenting a language translation of text depicted in the image.

FIG. 10 depicts screen shots of example user interfaces 1000A-1000C for capturing an image and presenting a language translation of text depicted in the image. In the screen shot 1000A, a user interface 1010 depicts an image 1015 of a menu, for example, captured in response to user selection of an image capture button 1012. The image 1015 depicts the name of the restaurant 1020 and a list of menu items 1022 in Chinese text. The image 1015 also depicts a price 1024 for each menu item 1022.

As shown near the top of the user interface 1010, the user has selected to translate Chinese text to English text. The translator 115 can identify the Chinese text in the image 1015 and determine which portions of the text are distinct text blocks based on the arrangement and presentation of the text (e.g., based on size of text, color of text, background color, and distance between portions of text). In this example, the translator 115 has identified the name of the restaurant 1020 as a distinct text block and each menu item as a distinct text block.

Figure 13:
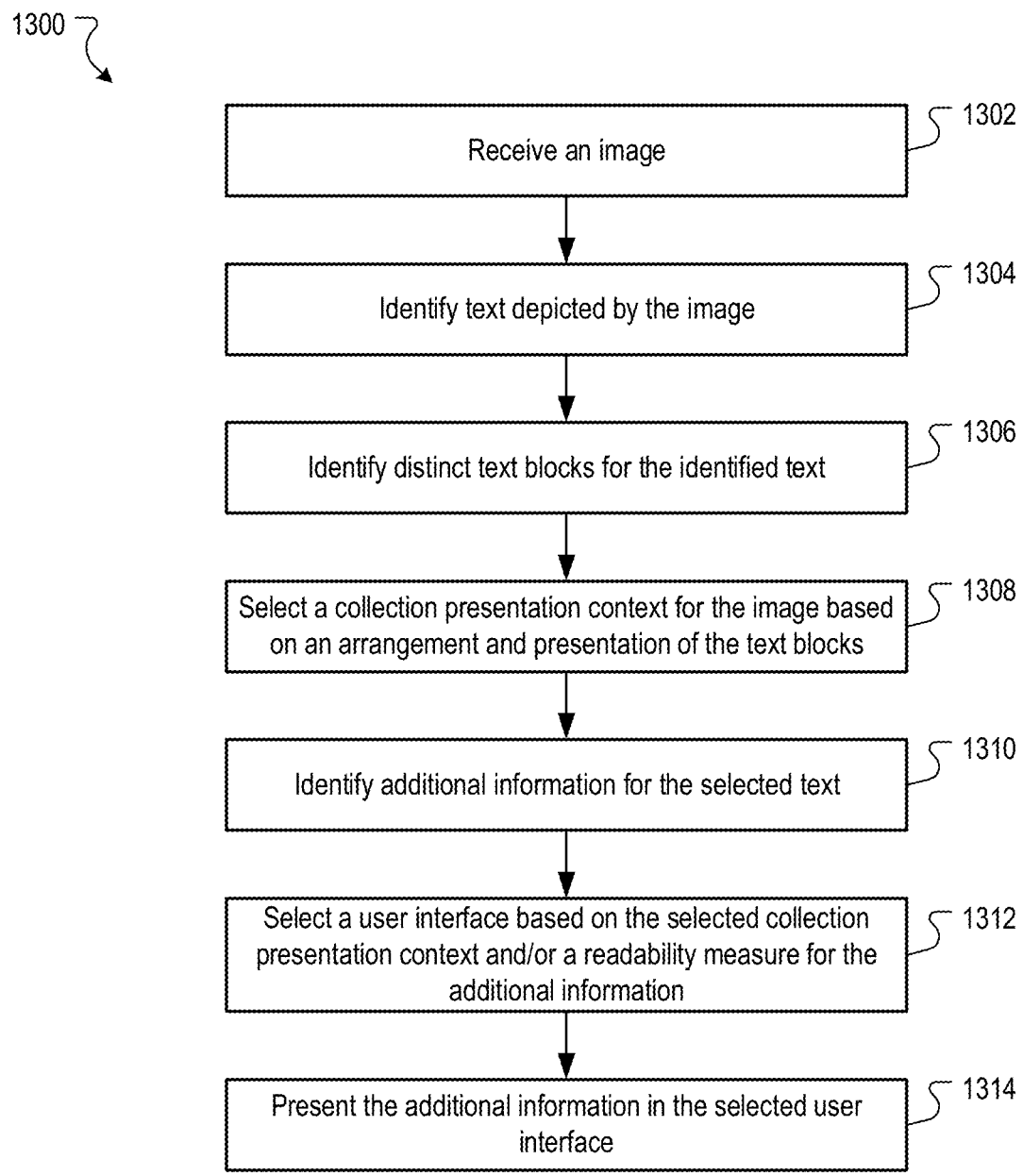
FIG. 13 is a flow chart of an example process for presenting additional information related to text depicted in an image based on a collection presentation context selected for the image.

The translator 115 can also evaluate the arrangement and presentation of the text blocks to determine whether two or more text blocks are related and should belong to a collection of text blocks. In particular, the translator 115 may evaluate the size and position of the text blocks, the background color of the text blocks, the style of text, and language models to determine whether to group text blocks into a collection. A process for determining which text blocks to group into a collection is illustrated in FIG. 13 and described below.

In this example, the translator 115 has identified the menu items as a single collection due to, for example, the similarity between the text and the background, and also due to the similar spacing between adjacent menu items. The name of the restaurant 1020 may be excluded from the collection due to, for example, its difference in orientation (e.g., centered on the menu) with respect to the menu items (e.g., left justified) and the difference in text and background colors between the name of the restaurant 1020 and the menu items 1022.

The translator 115 may select a single collection context for the image 1015 in response to identifying a single collection of text blocks in the image 1015. The translator 115 may also select a user interface for presenting a translation of the text depicted by the image 1015. This user interface may be selected from user interfaces that are eligible for, or correspond to a single collection context. For example, as shown in the screen shots 1000B and 1000C, user interfaces for a single collection context may enable the user to browse between translations of each text block included in the collection. A user interface 1030 depicted in the screen shot 1000B highlights the name of the restaurant with a box 1032 and highlights each menu item with a box 1034. In response to a selection of a highlighted text block, such as the name of the restaurant or a menu item, a user interface 1050 may be presented. This user interface 1050 presents the name of the restaurant in its original language (Chinese) and a translation 1054 of the name of the restaurant in the language (English) specified by the user. The user interface 1050 also includes a navigation control 1056 that enables the user to browse the translations of each menu item. For example, selection of the arrow 1058 may cause the user interface 1050 to present a translation of the next item and a selection of the arrow 1057 may cause the user interface 1050 to present a translation of the previous item. Another user interface element 1059 allows the user to request more information related to the displayed translation.

Although in this example, the user interface 1050 allows the user to browse to a translation of the name of the restaurant in addition to the translations of the menu items, in some implementations, the user interface 1050 may only include the text blocks included in the collection. Translations for other text blocks that are not included in the collection may be requested individually by selecting the highlighted text block in the user interface 1030.

Figure 11:
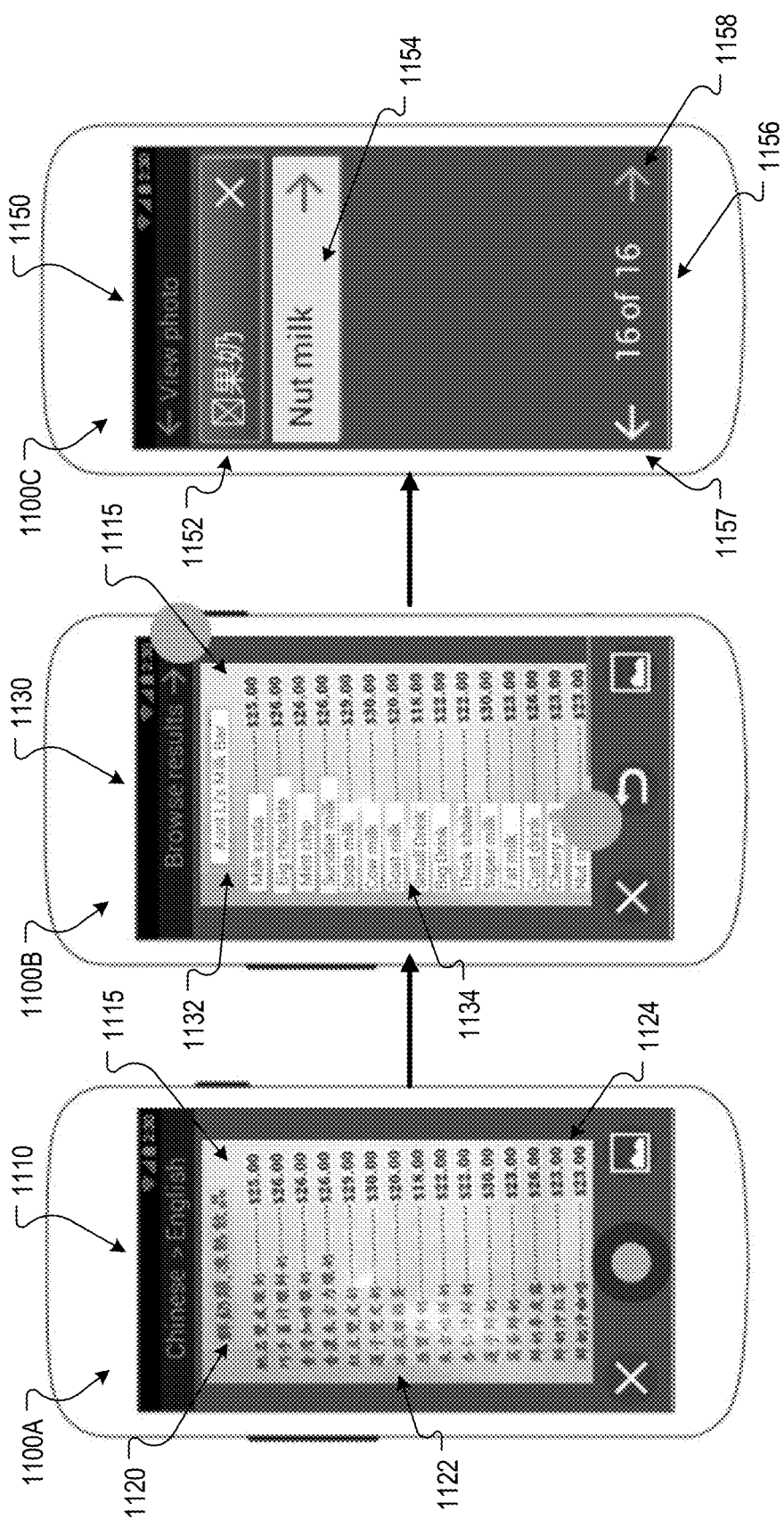
FIG. 11 depicts screen shots of example user interfaces for capturing an image and presenting a language translation of text depicted in the image.

User interfaces for a single collection context can also include a user interface that presents, for each text block of the collection, an overlay over the image that includes a translation for the text block. For example, FIG. 11 depicts screen shots 1100A-1100C of example user interfaces for capturing an image and presenting a language translation of text depicted in the image. The screen shot 1100A is similar to the screen shot 1000A of FIG. 10, and includes a user interface 1110 that presents an image 1115 having a name of a restaurant 1120, menu items 1122, and a price 1124 for each menu item 1122.

In the screen shot 1100B, a user interface 1130 presents the image 1115, an overlay 1132 that includes a translation of the name of the restaurant, and an overlay 1134 for each menu item. Each overlay 1134 includes a translation of its respective menu item. Each overlay 1132 and 1134 is also positioned over its respective text block to make it easy for a user to compare the translations to the actual menu and make an appropriate selection.

Each overlay 1132 and 1134 can also be selectable to request additional information related to the text. For example, as shown in screen shot 1100C, a user interface 1150 can be presented in response to the selection of an overlay. In this example, the user interface 1150 is presented in response to a selection of the overlay for "nut milk" displayed near the bottom of the image 1115. The user interface presents the original text 1152 for "nut milk" in Chinese characters, a translation 1154, and a navigation control 1156 that enables the user to browse the translations of each menu item and the restaurant name.

To determine whether to present the translations in overlays as show in FIG. 11 or in a browse mode as shown in FIG. 10, the translator 115 may evaluate readability measures as described above. If each of the readability measures for the translations in overlays satisfy a readability measure (e.g., by meeting or exceeding the readability measure), the translator 115 may present the translations in the overlays. Otherwise, the translator 115 may present the translations in a browse mode.

Figure 12:
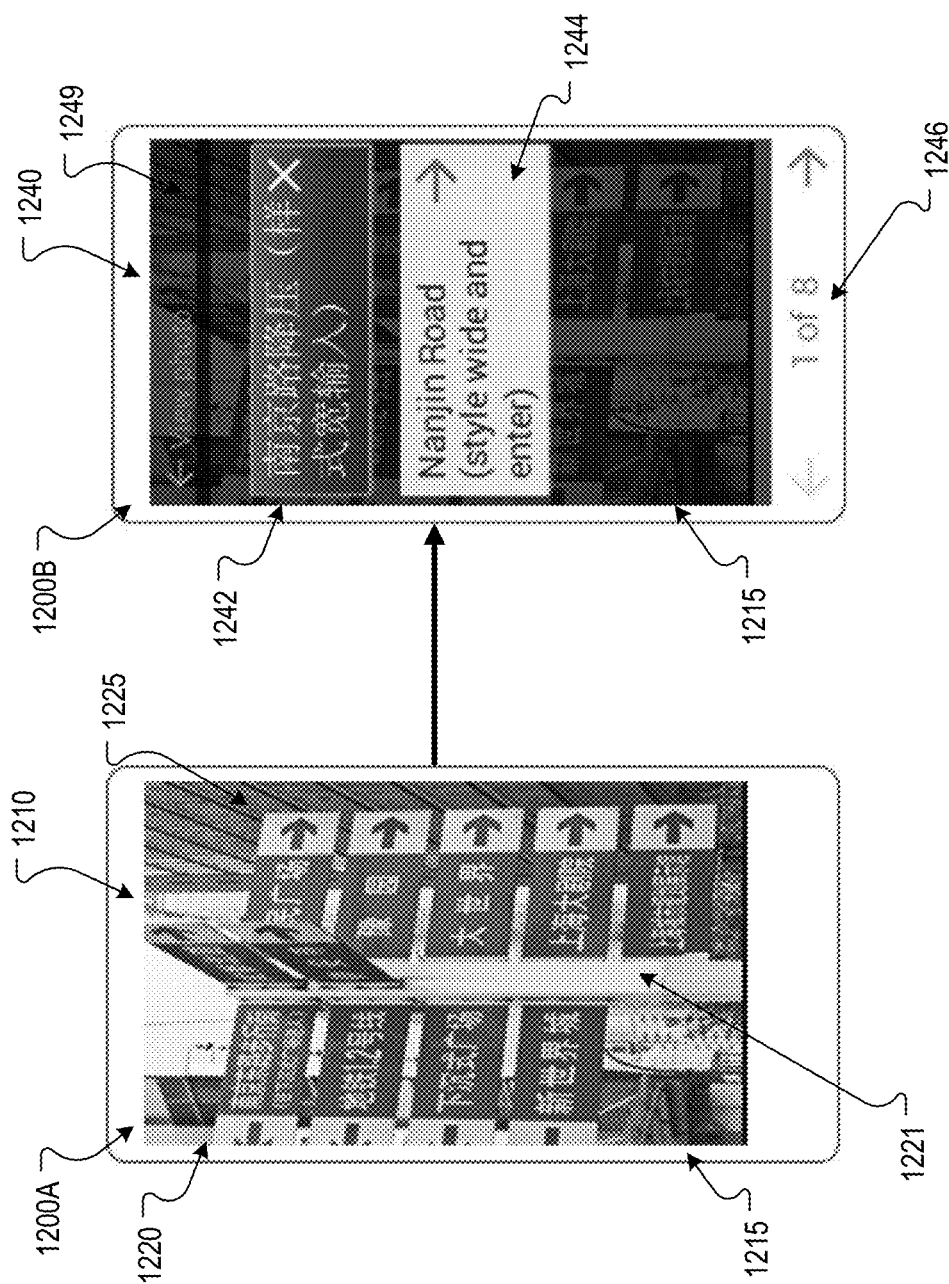
FIG. 12 depicts screen shots of example user interfaces for presenting a language translation of text depicted in the image.

Some images may be identified as including multiple collections of text blocks. For example, FIG. 12 depicts screen shots 1200A and 1200B of example user interfaces for presenting a language translation of text depicted in an image identified as having multiple collections of text blocks. In the screen shot 1200A, a user interface 1210 depicts an image 1215 of multiple street signs on a single support 1221. For example, a user may be at an intersection and trying to determine which way to go based on the signs.

The translator 115 can identify the text depicted on each street sign and evaluate the text to determine that each street sign includes a text block that is distinct from the text block of each other text block. For example, the translator 115 may determine that the text of each street sign is a distinct text block based on the distance between the text of each street sign and each other street sign and the discontinuity in background color between the adjacent street signs.

The translator 115 can also evaluate the arrangement and the presentation of the identified text blocks to identify groups of text blocks that may be related. Each group may then be classified as a collection. For example, the translator 115 can identify the text blocks of the street signs posted on the left side of the support 1221 as a first collection 1220 as the text blocks have the same text color, the same background color, the same orientation, a similar text size, and are spaced apart vertically at similar distances. Similarly, the translator 115 may identify a second collection 1225 that includes the text blocks of the street signs posted on the right side of the support 1221. The second collection 1225 may be identified as a separate collection from the first collection 1220 due to the separation between the text blocks provided by the support 1221.

In response to identifying multiple collections for the image 1215, the translator 115 may select a multiple collection context for the image 1215. The translator 115 may also select a user interface for presenting translations or other additional information related to the text blocks. The user interfaces for a multiple collection context can include a user interface that presents the translations in overlays and/or a user interface that enables the user to browse the translations using a navigation control. The selection between these two types of user interfaces may also be based on readability measures.

In the screen shot 1200B, a user interface 1240 presents a darkened version of the image 1215, the original text 1242 for one of the street signs, and a translation 1244 of the street sign. The user interface 1240 also includes a navigation control 1246 that enables the user to browse the translations of the street signs. In this example, the navigation control enables the user to browse translations for eight of the street signs. These eight street signs include each of the street signs of the first collection 1220, and the lower four street signs of the second collection 1225. The highest street sign of the second collection 1225 may be excluded as part of its text is clipped by other street signs. Thus, an accurate translation may not be available and translating the partial text may not be helpful to the user.

In some implementations, the user interface 1240 may enable the user to browse one of the two collections at a time. For example, the user interface may present a translation of a text block for a street sign of the first collection 1220 in response to selection of a text block in the first collection. The navigation control 1246 may then enable the user to browse translations for the text blocks of the first collection only, without including the text blocks of the second collection 1225. The user interface 1240 may also include a user interface element 1249 that, when selected, returns the user to the user interface 1210 depicting the image 1215. The user can then select a text block for a street sign of the second collection and browse translations of the text depicted by the street signs of the second collection using a user interface similar to the user interface 1240.

A translator, such as the translator 115, may evaluate the arrangement and visual characteristics of text depicted by an image to select a collection presentation context for the image. The translator 115 may also select a user interface for presenting additional information for at least a portion of the identified text. The user interface may be selected based on the selected collection presentation context. For example, if a multiple collection context is selected, a user interface that corresponds to the multiple collection contexts, such as the user interface 1240 of FIG. 12, may be selected.

FIG. 13 is a flow chart of an example process 1300 for presenting additional information related to text depicted in an image based on a collection presentation context selected for the image. Operations of the process 1300 can be implemented, for example, by a data processing apparatus, such as the user device 100 of FIG. 1. The process 1300 can also be implemented by instructions stored on computer storage medium, where execution of the instructions by a data processing apparatus cause the data processing apparatus to perform the operations of this process 1300.

An image is received (1302). For example, a user may take a picture of an object using a user device, such as a smartphone, tablet computer, or other user device. The sign may include text in a language foreign to the user, which is also depicted in the received image.

Text in the received image is identified (1304). The text may be identified using OCR or another text identification technique. In some implementations, only text of a particular language is identified. For example, the user may specify that text of a particular language should be translated to another language, such as a language understood by the user. In this example, only text of the particular language may be identified in the image.

In addition to the actual text, characteristics of the text may be identified. These characteristics may include the color of the text, the color of the background under the text, the size of the text, the type of font for the text, and/or the location of the text within the image. In addition, text that is clipped or otherwise incomplete may be ignored, as described above.

One or more distinct text blocks are identified based on the identified text (1306). Characteristics of the text can be evaluated to identify distinct text blocks. For example, text that is proximal (e.g., within a threshold distance) to other text and that has a similar appearance (e.g., similar size, text size, and/or background color) may be considered part of a text block A. Conversely, another portion of text that is far away (e.g., greater than a threshold distance) from text block A and that has a different text size, different text color, and/or different back ground color than the text of the text block A may be identified as another distinct text block B.

A collection presentation context for the image is selected based on the arrangement and/or the visual characteristics of the text blocks in the image (1308). The collection presentation context may be selected from a multitude of collection presentation contexts, such as from a single collection context, a multiple collection context, and/or an integrated collection context. To determine which collection context to select, one or more collections can be identified for the image.

Characteristics of the text blocks identified for the image can be evaluated to identify the collection(s). These characteristics can include the size and position of each text block, background color of the text blocks, the style of text (e.g., font, color, all-caps, lowercase, text size, etc.), and orientation of the text blocks can be used to group the text blocks into collections. Text blocks that have similar characteristics can be grouped together in a collection. For example, text blocks that have the same font, the same text color, the same background color, and that are proximal to each other (e.g., within a threshold distance of each other) may be grouped into a collection. Conversely, two text blocks that have different fonts and different colors may not be included in a collection together.

The relative distance between multiple text blocks can also be used to group text blocks into collections. For example, menus and lists often space lines of text equally or at least very similarly. The similar distance between multiple text blocks can indicate that the text blocks are similar and thus, can be used to determine that the multiple text blocks belong in a collection together.

The orientation of text blocks can also be used to determine whether the text blocks should be included in a collection together. For example, if several text blocks are oriented at a similar angle with respect to the image, then the text blocks may be related. Conversely, if the text of one text block has a horizontal orientation and the text of another text block slants upward at an angle with respect to the horizontal, the text blocks may not be related and thus, not included in a collection together.

The background color of each text block can also be compared to determine whether to include the text blocks in collection. Text blocks having a similar background color are likely to be related and may be included in a collection together. Conversely, text blocks having substantially different colors (e.g., one is blue and one is red) may not be related and may not be included in a collection together. For example, menu items presented in a list in a menu often have the same font color and background color. In this example, the menu items may be grouped into a collection together.

Language models can also be used to group text blocks into collections. For example, a language model may be used to determine whether the text of two or more text blocks are related. If the text blocks are determined to be related based on the language models, the text blocks may be included in a collection together.

A collection presentation context can be selected based on the collection(s) identified. For example, if multiple collections are identified, then a multiple collection context may be selected for the image. If a single collection is identified for the image, then a selection can be made between a single collection context and an integrated collection context. The single collection context may be selected when the additional information for each text block included in the collection can be presented independently of each other text block. For example, a single collection context may be selected for collections of menu items. An integrated text block may be selected when the additional information is related such that the additional information should be presented together. For example, it may be better to show translations of street signs together so that the user can match the translation to its corresponding street sign.

To select between a single collection context and an integrated collection context, language models can be used. For example, a language model may be used to determine that the text refers to multiple food items on a menu or that the text refers to multiple street signs. The presence of identifiers, such as numbers or prices, may also be used to select between the single collection context and the integrated collection context. If each text block in the collection includes an identifier, then each text block may be presented independently. Thus, a single collection context may be selected rather than an integrated collection context.

Additional information is identified for the text (1310). The additional information may include a language translation of the selected text. For example, the user may select a language in which the user wants text depicted by the image to be translated. For text that includes an amount in a currency, the additional information may include a conversion of the amount to a currency specified by the user. For example, if the selected text includes a price in Japanese yen, the additional information may include a dollar amount that corresponds to the price in yen.

A user interface is selected based on the selected collection presentation context and/or a readability measure for the additional information (1312). Each collection presentation context may have one or more corresponding user interfaces that can be used to present additional information for text depicted in an image. In addition, the user interface(s) eligible for one collection presentation context may be different from the user interface(s) for each other collection presentation context.

The multiple collection context may have a user interface that presents the additional information in overlays over the image (e.g., similar to the user interface 1130 of FIG. 11) and/or a user interface that enables the user to browse the additional information for each text block in the collections in one or more separate screens (e.g., the user interface 1240 of FIG. 12). As described above, each collection may be browsed separately then each other collection in user interface like the user interface 1240.

The single collection context may also include a user interface that presents the additional information in overlays over the image (e.g., similar to the user interface 1130 of FIG. 11) and/or a user interface that enables the user to browse the additional information for each text block in the collection in one or more separate screens (e.g., the user interface 1240 of FIG. 12). In some implementations, the single collection context may correspond to a user interface that automatically defaults to presenting additional information for each text block of a collection separately. For example, if each text block includes an identifier, the default or preferred user interface may be one that presents the additional information for each text block separately and allows the user to browse to additional information for each other text block of the collection.

The integrated collection context may be associated with user interfaces that present the additional information for each text block included in a collection at the same time or on the same screen (e.g., with a user interface element that allows the user to browse information that does not fit on the screen). The user interfaces for the integrated collection context may include a user interface that presents the additional information in one or more overlays over the image and a user interface that presents the additional information on a separate screen. In an example of an overlay user interface, the translation for each street sign of FIG. 12 may be presented in an overlay over its corresponding street sign. In this way, the user can easily determine which translation corresponds to which street sign.

Each collection presentation context may have a preferred user interface for that context. For example, the preferred user interface for multiple collection contexts and integrate collection contexts may be one that presents the additional information in overlays over the image. The preferred user interface for a single collection context may be one that presents the additional information for each text block separately.

In some implementations, a readability measure for the additional information is used to select the user interface for presenting the additional information. The readability measure can be used to determine whether to use the preferred user interface (e.g., one with overlays over the image) for the selected collection presentation context or to use an alternative user interface (e.g., one that enables a user to browse additional information). For example, if the readability measure for additional information with respect to the preferred collection presentation context satisfies a readability threshold (e.g., by meeting or exceeding the readability threshold), the preferred user interface may be selected. If the readability measure for the additional information with respect to the preferred collection presentation context does not satisfy the readability threshold (e.g., the readability measure is less than the readability threshold), an alternative user interface that allows for the presentation of more characters of the additional information may be selected.

The readability measure may be used to select between multiple user interfaces independent of a preferred user interface. For example, the user interface that is eligible for the selected collection presentation context and that results in the highest readability measure may be selected.

The additional information is presented using the selected user interface (1314). For example, the user device may generate the user interface and present the additional information in the selected interface.

Map Presentation Contexts and User Interfaces

In some contexts, it may be beneficial to a user to receive a map or directions to a location based on text depicted in an image. For example, the user may take a picture of a poster for an event that includes an address to the event. Presenting a user interface that includes a map with a translation of the location or a translation of the address may help the user in identifying the event and determining how to get to the event.

A translator, such as the translator 115 of FIG. 1, may select a map presentation context when the presentation of a map user interface may be beneficial to the user. For example, the translator 115 may select the map presentation context in response to detecting one or more addresses depicted by a captured image. The user interface for a map presentation context may include a map corresponding to the detected address(es) and/or the user's current location if the user has provided location information to the translator 115.

The map presentation contexts can include a single address map context and a multiple address map context. The single address map context can be selected in response to a single address being detected in the image. A user interface for a single address map context may include a map that shows the location corresponding to the single address and/or directions to the single address. The user interface may also present a language translation of the address and/or a language translation of a name of the location or building referenced by the address. A user interface for a multiple address map context may include a control that enables a user to browse between information for each detected address. For example, the user interface may enable the user to browse between cards or screens that each show a map and/or directions for a particular address of the multiple addresses. Each card or screen can also present a language translation of the address and/or a language translation of a name of the location or building referenced by the address for which the card or screen corresponds. The directions provided in a map presentation context user interface may be in the translation language specified by the user.

Figure 14:
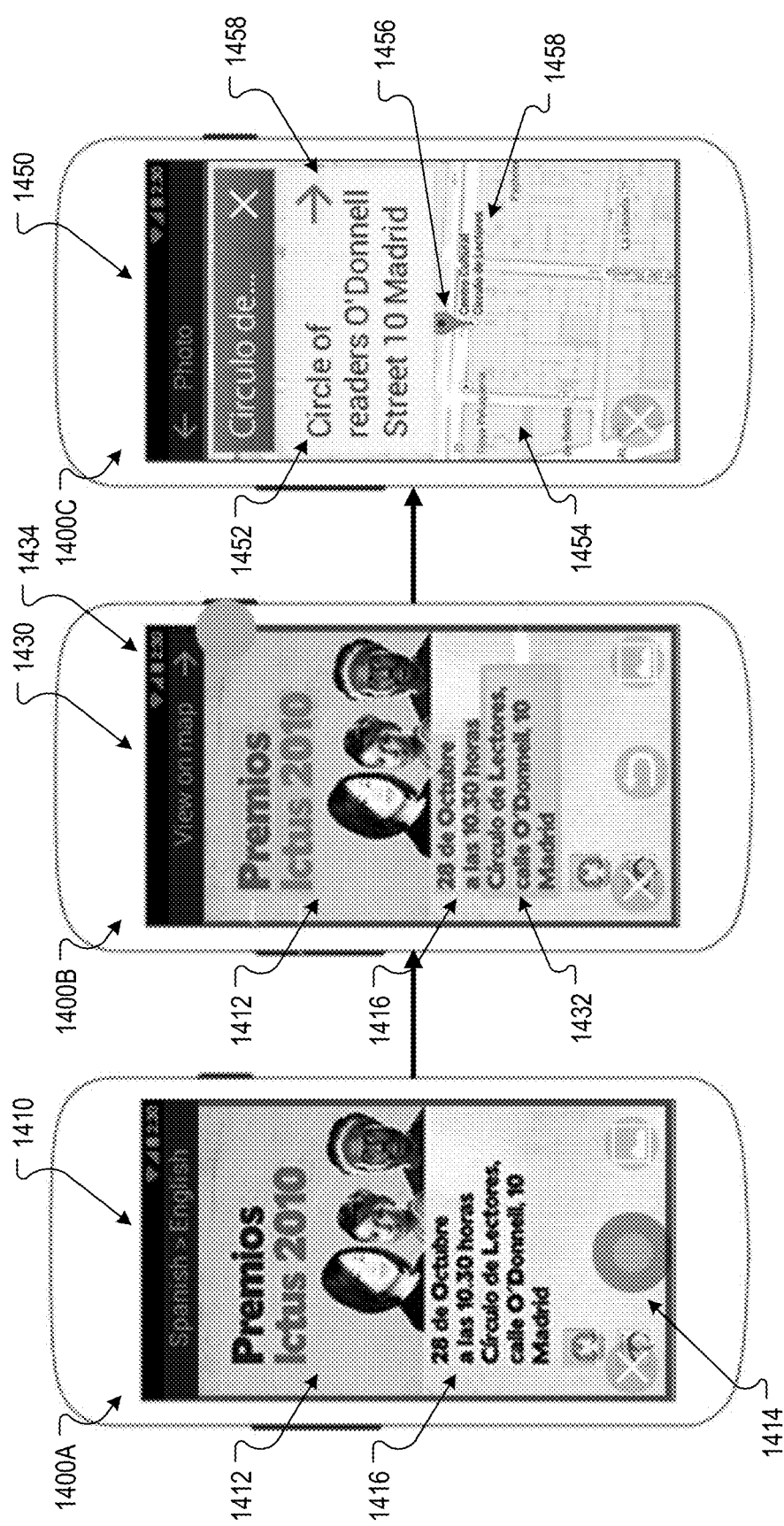
FIG. 14 depicts screen shots of an example user interface for presenting a language translation of text depicted in the image identified as having a map context.

FIG. 14 depicts screen shots of example user interfaces 1400A-1400C for presenting additional information related to text depicted in an image identified as having a map context. In the screen shot 1400A, an image 1412 is captured and presented in a user interface 1410, for example, in response to user selection of an image capture button 1414. The example image 1412 includes information related to an event and an address 1416 for the event.

The translator 115 can analyze the text in the image 1412 to identify the address 1416. For example, the translator 115 can identify the text in the image and compare the identified text to known addresses. If there is a match, the translator 115 may identify the text as an address 1416. In response to identifying the address 1416, a user interface may be provided that allows the user to request and obtain additional information related to the address 1416, such as a map and/or directions to the address. For example, a user interface 1430 may be presented as shown in the screen shot 1400B.

In the screen shot 1400B, the user interface 1430 highlights the address 1416 using a box 1432 around the address 1416. The user interface 1430 also provides a "View on map" control 1434 that allows the user to view a map corresponding to the address 1416. In response to selection of the control 1434, a user interface 1450 may be presented as shown in the screen shot 1400C. The user interface 1450 presents a map 1454 that includes the location of the address, an overlay 1452 that includes a translation of the address, a marker 1456 on the map 1454 that identifies the address 1416, and text 1458 identifying the address 1416. In addition, or in the alternative, the user interface 1450 may present a translation of the name of the building or the location in which the event is going to take place.

In some implementations, a user interface that presents a map or directions, along with a translation of the address or the location, may be presented automatically in response to identifying the address in an image. For example, the user interface 1450 may be presented in response to detecting the address 1416 without the user selecting the control 1434.

The example user interface 1450 also includes a browse control 1458 that would enable the user to browse to another card or screen if there was another address identified in the image 1412. For example, selection of the browse control 1458 may cause the user device to present a map and translation for another address identified in the image 1412.

Figure 15:
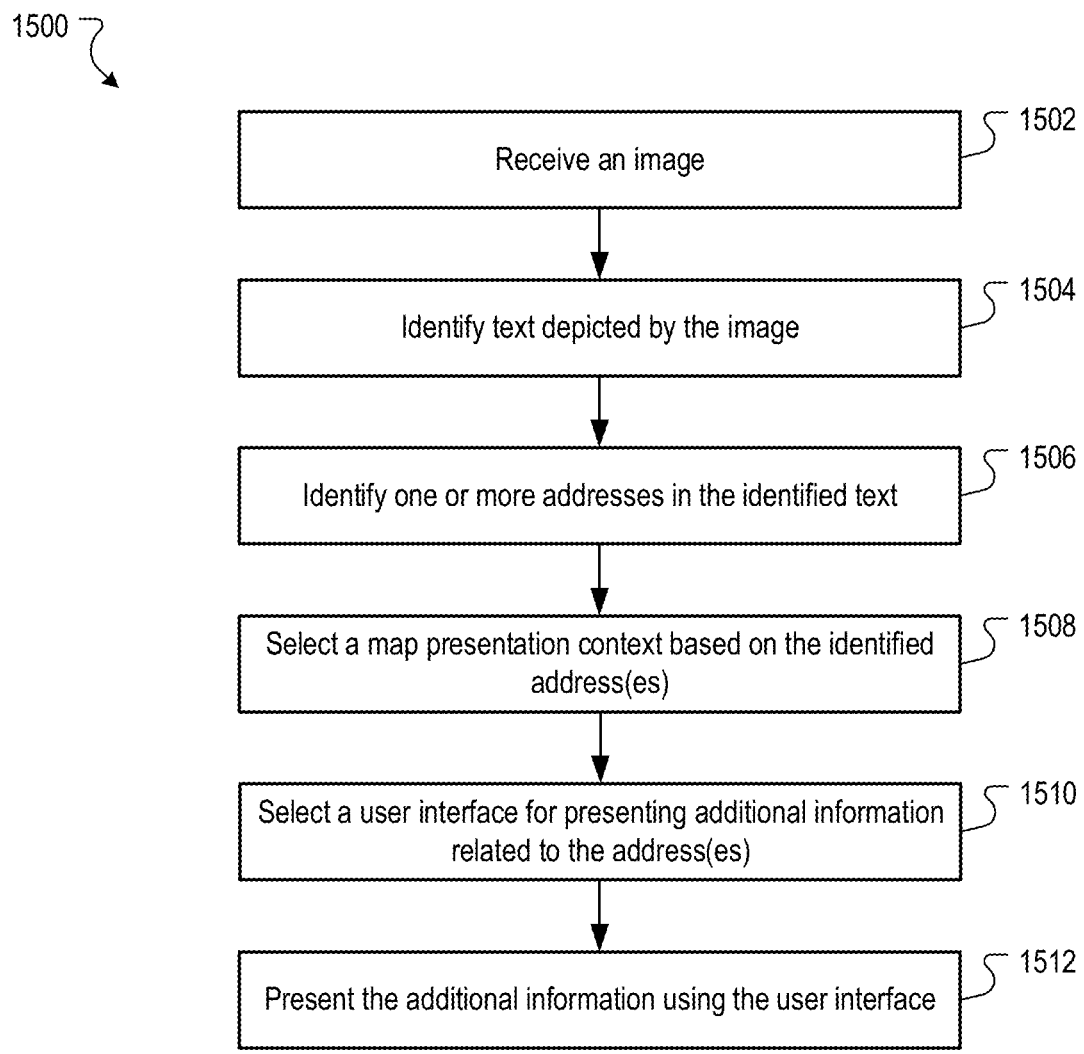
FIG. 15 is a flow chart of an example process for presenting additional information related to text depicted in an image based on a map presentation context selected for the image.

FIG. 15 is a flow chart of an example process 1500 for presenting additional information related to text depicted in an image based on a map presentation context selected for the image. Operations of the process 1500 can be implemented, for example, by a data processing apparatus, such as the user device 100 and/or the translator 115 of FIG. 1. The process 1500 can also be implemented by instructions stored on computer storage medium, where execution of the instructions by a data processing apparatus cause the data processing apparatus to perform the operations of this process 1500.

An image is received (1502). For example, a user may take a picture of an object using a user device, such as a smartphone, tablet computer, or other user device. The sign may include text in a language foreign to the user, which is also depicted in the received image.

Text in the received image is identified (1504). The text may be identified using OCR or another text identification technique. In some implementations, only text of a particular language is identified. For example, the user may specify that text of a particular language should be translated to another language, such as a language understood by the user. In this example, only text of the particular language may be identified in the image.

An address is identified in the identified text (1506). For example, the identified text may be compared to known addresses to determine whether the identified text refers to an address. If the image depicts multiple addresses, each address may be identified.

A map presentation context is identified based on the identified address(es) (1508). In some implementations, the map context is selected based on a number of addresses identified in the image. For example, a single address map context may be selected in response to a single address being identified in the image, while a multiple address map context may be selected in response to more than one address being identified in the image.

A user interface is selected for presenting additional information related to the identified address(es) (1510). As described above, a user interface for a map presentation context may depict a map that shows a location corresponding to the address and/or directions to the address from the user's current location if the user has provided access to the current location. The user interface for a map presentation context may also include a language translation of the address or the name of the location that corresponds to the address in an overlay over the map or directions. For a single address map context, the user interface may include a map and/or directions for the single address. For a multiple map context, the user interface may include controls for browsing maps and directions for each identified location, as described above with reference to FIG. 14.

Additional information for the address(es) is presented using the selected user interface (1512). For example, a user interface may be generated that presents a map or directions to an address and an overlay that presents a translation of the address or the name of the location that corresponds to the address. This user interface may be presented automatically in response to identifying an address in the image. In some implementations, a user interface may be presented that allows the user to view a map user interface in response to identifying an address in the image. For example, a user interface similar to the user interface 1430 of FIG. 14 may be generated and presented. Upon selection of the "view on map" control 1434, the user interface having the map or directions may be presented.

Example Process for Selecting a Presentation Context for an Image

As described above, in addition to selecting a presentation context within each category of presentation contexts (e.g., within the prominence presentation category or the collection presentation category), the translator 115 can select a category of presentation context for an image. For example, in response to receiving an image, the translator 115 may determine whether to select a prominence presentation context for the image, a collection presentation context for the image, or a map context for the image. This selection can be made based on the arrangement and/or visual characteristics of text depicted by the image.

The translator 115 may also select a user interface for presenting additional information related to text depicted by the image based on the selected presentation context. As described above, each presentation context may be associated with one or more user interfaces and the user interface(s) for one presentation context may differ from the user interface(s) for the other presentation contexts. For example, the user interface for presenting a translation of a dominant text block in an overlay is different from the user interface for presenting translations of each text block of a single collection context separately.

Figure 16:
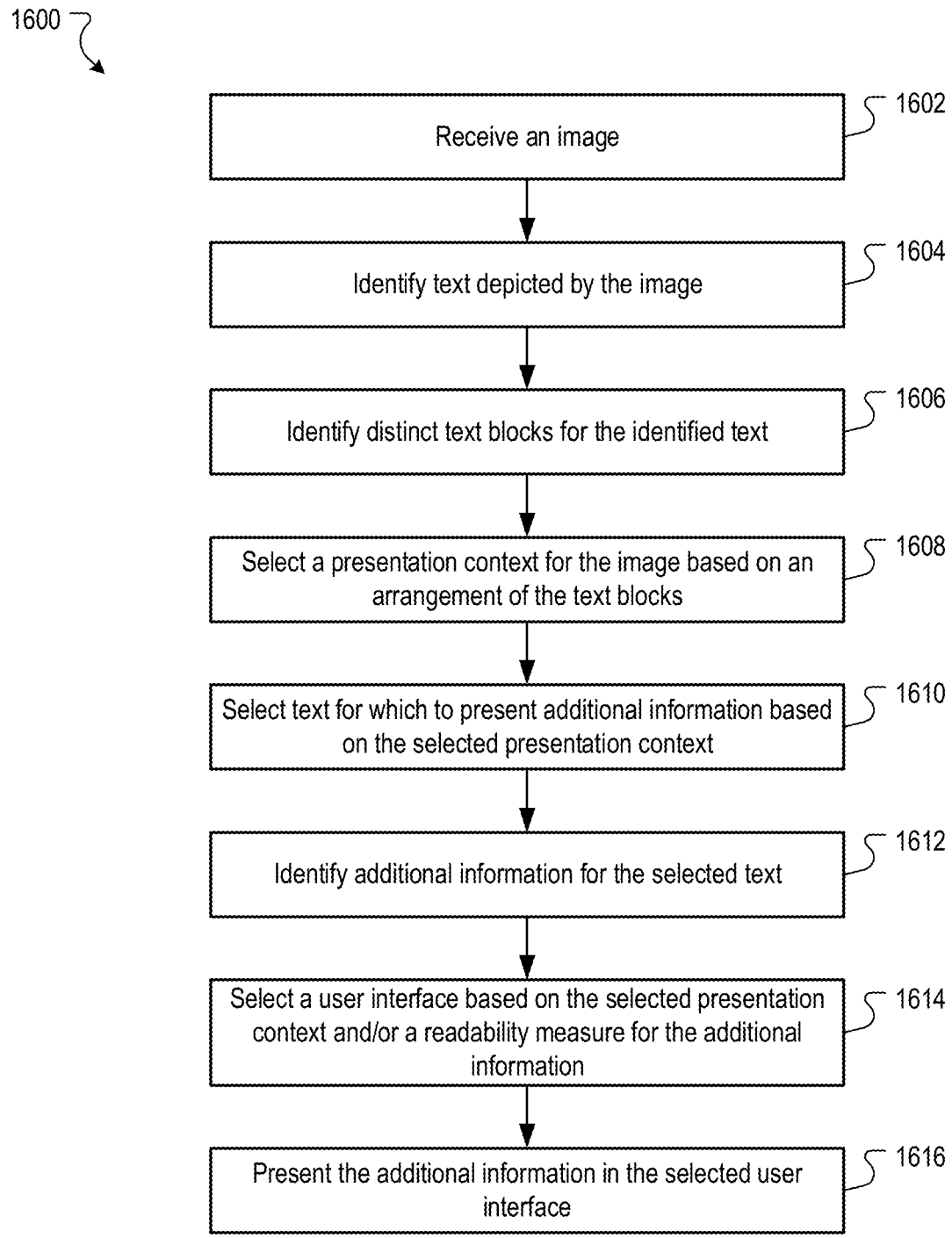
FIG. 16 is a flow chart of an example process for presenting additional information related to text depicted in an image based on a presentation context selected for the image.

FIG. 16 is a flow chart of an example process 1600 for presenting additional information related to text depicted in an image based on a presentation context selected for the image. Operations of the process 1600 can be implemented, for example, by a data processing apparatus, such as the user device 100 and/or the translator 115 of FIG. 1. The process 1600 can also be implemented by instructions stored on computer storage medium, where execution of the instructions by a data processing apparatus cause the data processing apparatus to perform the operations of this process 1600.

An image is received (1602). For example, a user may take a picture of an object using a user device, such as a smartphone, tablet computer, or other user device. The sign may include text in a language foreign to the user, which is also depicted in the received image.

Text in the received image is identified (1604). The text may be identified using OCR or another text identification technique. In some implementations, only text of a particular language is identified. For example, the user may specify that text of a particular language should be translated to another language, such as a language understood by the user. In this example, only text of the particular language may be identified in the image.

In addition to the actual text, characteristics of the text may be identified. These characteristics may include the color of the text, the color of the background under the text, the size of the text, the type of font for the text, and/or the location of the text within the image. In addition, text that is clipped or otherwise incomplete may be ignored, as described above.

One or more distinct text blocks are identified based on the identified text (1606). Characteristics of the text can be evaluated to identify distinct text blocks. For example, text that is proximal (e.g., within a threshold distance) to other text and that has a similar appearance (e.g., similar size, text size, and/or background color) may be considered part of a text block A. Conversely, another portion of text that is far away (e.g., greater than a threshold distance) from text block A and that has a different text size, different text color, and/or different back ground color than the text of the text block A may be identified as another distinct text block B.

A presentation context is selected for the image based on an arrangement of the text blocks and/or characteristics of the text blocks (1608). Based on the text blocks, it may be determined whether the image matches well with one of the presentation contexts. For example, if the image includes multiple text blocks that can be grouped into one or more collections, a collection presentation context may be selected. In this example, the image may be analyzed to identify any collections in the image and, if any collections are identified, a number of the collections identified. If no collections are identified, the prominence of each identified text block may be evaluated to determine whether a prominence presentation context should be selected for the image. If one or more of the text blocks are depicted prominently in the image, then a prominence presentation context may be selected for the image.

The identified text block(s) may also be analyzed to determine whether an address is included in the text block (s). If an address is detected, then a map presentation context may be identified automatically in response to detecting the address. In some implementations, the map presentation context may be selected when there are less than a threshold number of addresses detected in the text blocks. For example, an image may contain many addresses and a collection context or prominence context may be more appropriate. If the text blocks having the addresses can be grouped into a collection, then a collection presentation context may be selected. If one of the addresses is depicted much more prominently than others (e.g., the address has a prominence score that is more than a threshold amount greater than the prominence scores of other addresses), then a prominence presentation context may be selected.

In some implementations, one or more of the processes 900, 1300, and 1500 described above may be performed for the image and each presentation context may be scored based on how well the presentation context matches the image. The presentation context having the highest score may then be selected for the image.

The presentation context may be selected based on a number of distinct text blocks identified in the image. For example, if the number of text blocks identified in the image exceeds a threshold number of text block, a collection presentation context may be selected and the text blocks may be included in a collection. If less than the threshold number of text blocks is identified in the image, a prominence presentation context may be selected. The prominence presentation context selected may be based on the prominence of each text block identified, as described above.

Text for which additional information is to be presented is selected based on the selected prominence presentation context (1610). In some presentation contexts, additional information is presented for only a portion of the identified text. For example, if the dominant-secondary text block is selected, additional information for the text block identified as being the dominant text block may be identified. Thus, the text of the dominant text block may be selected for presenting additional information. If a collection presentation context is selected, then each text block of the identified collection(s) may be identified. If a map presentation context is selected, then each identified addresses in the image may be selected for presenting additional information.

Additional information is identified for the selected text (1612). The additional information may include a language translation of the selected text. For example, the user may select a language in which the user wants text depicted by the image to be translated. For text that includes an amount in a currency, the additional information may include a conversion of the amount to a currency specified by the user. For example, if the selected text includes a price in Japanese yen, the additional information may include a dollar amount that corresponds to the price in yen.

A user interface is selected based on the selected presentation context and/or a readability measure for the additional information (1614). As described above, each presentation context can be associated with one or user interfaces that are eligible to be used for presenting additional information related to text depicted in an image for which the presentation context is selected. One of the user interfaces for the selected presentation context may be selected, for example, based on a preferred user interface for the selected presentation context and/or on readability measures for the eligible user interface(s) and the additional information, as described above.

The additional information is presented using the selected user interface (1616). For example, the user device may generate the user interface and present the additional information using the selected user interface.

ADDITIONAL IMPLEMENTATION DETAILS

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving, from a user device, an image;
   detecting, in the image, an address for a particular geographic location;
   determining that the address is in a first language different from a second language specified by a user of the user device, the second language being a language specified by the user as a language to which text found within images in a different language from the second language is to be translated, wherein the second language is specified by the user of the user device using a user interface presented by the user device prior to receiving the image; and
   in response to detecting the address for the particular geographic location in the first language and determining that the first language is different from the second language, generating and providing, for presentation by the user device, a user interface that depicts a map that includes the particular geographic location and a translation of the address in the second language specified by the user.

2. The method of claim 1, further comprising determining a geographic location of the user device, wherein the map includes directions from the geographic location of the user device to the particular geographic location.

3. The method of claim 1, further comprising selecting the user interface from multiple user interfaces based on a number of addresses detected in the image.

4. The method of claim 3, further comprising determining that the address for the particular geographic location is the only address depicted by the image, wherein the user interface that depicts the map that includes the particular geographic location and the translation of the address in the second language different is selected in response to determining that the address for the particular geographic location is the only address depicted by the image.

5. The method of claim 3, further comprising detecting one or more additional addresses for one or more additional geographic locations, wherein the user interface presents a control that enables the user to navigate between maps for each detected address.

6. The method of claim 4, wherein each map is presented on a respective user interface card and each user interface card includes a translation, in the second language, of the address for the geographic location corresponding to the map presented on the user interface card.

7. The method of claim 1, wherein the user interface depicts, in the second language, a name of a building located at the particular geographic location.

8. A system, comprising:
   a data processing apparatus; and
   a memory storage apparatus in data communication with the data processing apparatus, the memory storage apparatus storing instructions executable by the data processing apparatus and that upon such execution cause the data processing apparatus to perform operations comprising:
   receiving, from a user device, an image;
   detecting, in the image, an address for a particular geographic location;
   determining that the address is in a first language different from a second language specified by a user of the user device, the second language being a language specified by the user as a language to which text found within images in a different language from the second language is to be translated, wherein the second language is specified by the user of the user device using a user interface presented by the user device prior to receiving the image; and
   in response to detecting the address for the particular geographic location in the first language and determining that the first language is different from the second language, generating and providing, for presentation by the user device, a user interface that depicts a map that includes the particular geographic location and a translation of the address in the second language specified by the user.

9. The system of claim 8, wherein the operations comprise determining a geographic location of the user device, wherein the map includes directions from the geographic location of the user device to the particular geographic location.

10. The system of claim 8, wherein the operations comprise selecting the user interface from multiple user interfaces based on a number of addresses detected in the image.

11. The system of claim 10, wherein the operations comprise determining that the address for the particular geographic location is the only address depicted by the image, wherein the user interface that depicts the map that includes the particular geographic location and the translation of the address in the second language different is selected in response to determining that the address for the particular geographic location is the only address depicted by the image.

12. The system of claim 10, wherein the operations comprise detecting one or more additional addresses for one or more additional geographic locations, wherein the user interface presents a control that enables the user to navigate between maps for each detected address.

13. The system of claim 12, wherein each map is presented on a respective user interface card and each user interface card includes a translation, in the second language, of the address for the geographic location corresponding to the map presented on the user interface card.

14. The system of claim 8, wherein the user interface depicts, in the second language, a name of a building located at the particular geographic location.

15. A non-transitory computer-readable storage medium encoded with a computer program, the program comprising instructions that when executed by a data processing apparatus cause the data processing apparatus to perform operations comprising:
receiving, from a user device, an image;
detecting, in the image, an address for a particular geographic location;
determining that the address is in a first language different from a second language specified by a user of the user device, the second language being a language specified by the user as a language to which text found within images in a different language from the second language is to be translated, wherein the second language is specified by the user of the user device using a user interface presented by the user device prior to receiving the image; and
in response to detecting the address for the particular geographic location in the first language and determining that the first language is different from the second language, generating and providing, for presentation by the user device, a user interface that depicts a map that includes the particular geographic location and a translation of the address in the second language specified by the user.

16. The non-transitory computer-readable storage medium of claim 15, wherein the operations comprise determining a geographic location of the user device, wherein the map includes directions from the geographic location of the user device to the particular geographic location.

17. The non-transitory computer-readable storage medium of claim 15, wherein the operations comprise selecting the user interface from multiple user interfaces based on a number of addresses detected in the image.

18. The non-transitory computer-readable storage medium of claim 17, wherein the operations comprise determining that the address for the particular geographic location is the only address depicted by the image, wherein the user interface that depicts the map that includes the particular geographic location and the translation of the address in the second language different is selected in response to determining that the address for the particular geographic location is the only address depicted by the image.

19. The non-transitory computer-readable storage medium of claim 17, wherein the operations comprise detecting one or more additional addresses for one or more additional geographic locations, wherein the user interface presents a control that enables the user to navigate between maps for each detected address.

20. The non-transitory computer-readable storage medium of claim 19, wherein each map is presented on a respective user interface card and each user interface card includes a translation, in the second language, of the address for the geographic location corresponding to the map presented on the user interface card.

* * * * *